US012576947B1

(12) United States Patent
Nichols et al.

(10) Patent No.: US 12,576,947 B1
(45) Date of Patent: Mar. 17, 2026

(54) ROCKER LINK SHIFTING SYSTEM FOR A CONTINUOUSLY VARIABLE TRANSMISSION

(71) Applicant: enviolo B.V., Amsterdam (NL)

(72) Inventors: Jon M. Nichols, Georgetown, TX (US); Siddhesh Ozarkar, Leander, TX (US)

(73) Assignee: enviolo B.V., Amsterdam (NL)

( * ) Notice: Subject to any disclaimer, the term of this patent is extended or adjusted under 35 U.S.C. 154(b) by 0 days.

(21) Appl. No.: 19/066,155

(22) Filed: Feb. 28, 2025

(51) Int. Cl.
| | |
|---|---|
| F16H 15/50 | (2006.01) |
| B62M 11/14 | (2006.01) |
| F16H 63/06 | (2006.01) |

(52) U.S. Cl.
CPC .......... B62M 11/14 (2013.01); F16H 15/503 (2013.01); F16H 63/067 (2013.01)

(58) Field of Classification Search
CPC ................................................... F16H 15/503
See application file for complete search history.

(56) References Cited

U.S. PATENT DOCUMENTS

| | | | | |
|---|---|---|---|---|
| 2006/0084549 | A1* | 4/2006 | Smithson | B62M 9/00 476/40 |
| 2010/0267510 | A1* | 10/2010 | Nichols | F16H 15/503 475/331 |
| 2011/0230297 | A1* | 9/2011 | Shiina | F16H 15/52 475/196 |
| 2017/0268638 | A1* | 9/2017 | Nichols | F16H 61/664 |

* cited by examiner

*Primary Examiner* — Ernesto A Suarez
*Assistant Examiner* — Lillian T Nguyen
(74) *Attorney, Agent, or Firm* — Sheppard Mullin Richter & Hampton LLP

(57) ABSTRACT

A speed ratio adjusting mechanism for a continuously variable planetary (CVP) drive comprises a shift driver engaging a rocker gear, the rocker gear being rotatably coupled to an input carrier using a journal and rotatably coupled to a rocker link with a revolute joint. The rocker link is coupled to an end of a planet axle, wherein rotation of the shift driver rotates the rocker gear to translate the rocker link, imparting a skew angle on the planet axle to cause a change in tilt angle.

20 Claims, 30 Drawing Sheets

ROCKER LINK SHIFTING SYSTEM FOR A CONTINUOUSLY VARIABLE TRANSMISSION

FIELD OF THE DISCLOSURE

The field of the disclosure relates generally to continuously variable transmissions (CVTs), and more particularly to adjusting speed ratios of continuously variable planetary transmissions (CVPs).

DESCRIPTION OF THE RELATED ART

There are several ways to achieve continuously variable ratios of input speed to output speed. The mechanism for adjusting an input speed from an output speed in a CVT is known as a variator. In a belt-type CVT, the variator consists of two adjustable pulleys having a belt between them. The variator in a single cavity toroidal-type CVT has two partially toroidal transmission discs rotating about a shaft and two or more disc-shaped power rollers rotating on respective axes that are perpendicular to the shaft and clamped between the input and output transmission discs.

Spherical-type variator utilizing spherical speed adjusters (also known as power adjusters, balls, sphere gears or rollers) may each have a tiltable axis of rotation. The adjusters are distributed in a plane about a longitudinal axis of a CVT. The adjusters are contacted on one side by an input disc and on the other side by an output disc. The input disc applies input torque at an input rotational speed to the adjusters. As the adjusters rotate about their own axes, the adjusters transmit the torque to the output disc. The input speed to output speed ratio is a function of the radii of the contact points of the input and output discs to the axes of the adjusters. Tilting the axes of the adjusters with respect to the axis of the variator adjusts the speed ratio.

SUMMARY

Embodiments disclosed herein may be generally directed to a speed ratio adjusting mechanism for a continuously variable planetary (CVP) transmission having a plurality of planets disposed between a first traction ring and a second traction ring, the plurality of planets arranged around a main shaft defining a main axis of rotation, each planet having a planet axle defining a planet axis of rotation. The adjusting mechanism may comprise: a fixed carrier positioned on a first side of the plurality of planets, the rotatable carrier comprising a first plurality of slots for receiving a first end of each planet axle; a timing plate positioned on a second side of the plurality of planets, the timing plate being grounded to the fixed carrier and comprising a second plurality of slots for receiving a second end of each planet axle; an input carrier positioned on the second side of the plurality of planets, the input carrier grounded to the timing plate; a rocker link comprising a first end rotatably coupled to the first end of the planet axle; a rocker gear rotatably coupled to a second end of the rocker link; and a shift driver engaged with the rocker gear. The rocker gear may comprise a journal rotatably coupled to the input carrier, and an eccentric pin grounded to the timing plate. Rotation of the shift driver rotates the rocker gear to rotate the rocker link, wherein the rocker link rotates the input carrier to impart a skew angle on the planet axle to cause the planet axle to tilt to a speed ratio. In some embodiments, the rocker gear comprises a rocker gear slot having a first stop face and a second stop face, and the input carrier comprises a stop feature extending axially into the rocker gear slot, wherein the stop feature contacting the first stop face defines a minimum radial position of the second end of each planet axle, and the stop feature contacting the second stop face defines a maximum radial position of the second end of each planet axle. In some embodiments, the rocker link is rotatably coupled to the rocker gear by a revolute joint. In some embodiments, the rocker link is rotatably coupled to the second end of each planet axle by a spherical joint. In some embodiments, the spherical joint comprises an axle cap on the second end of each planet axle.

Embodiments disclosed herein may be generally directed to a continuously variable planetary (CVP) transmission comprising: a plurality of planets disposed between a first traction ring and a second traction ring, the plurality of planets arranged around a main shaft defining a main axis of rotation, each planet having a planet axle defining a planet axis of rotation; and an adjusting mechanism comprising: a fixed carrier positioned on a first side of the plurality of planets, the rotatable carrier comprising a first plurality of slots for receiving a first end of each planet axle; a timing plate positioned on a second side of the plurality of planets, the timing plate being grounded to the fixed carrier and comprising a second plurality of slots for receiving a second end of each planet axle; an input carrier positioned on the second side of the plurality of planets, the input carrier grounded to the timing plate; a rocker link comprising a first end rotatably coupled to the first end of the planet axle; a rocker gear rotatably coupled to a second end of the rocker link, a shift driver engaged with the rocker gear; and an actuator coupled to the shift driver. The rocker gear comprises a journal rotatably coupled to the input carrier; and an eccentric pin grounded to the timing plate, wherein the actuator provides an input to the shift driver to cause rotation of the shift driver to rotate the rocker gear to translate the rocker link, wherein translation of the rocker link imparts a skew angle on the planet axle to cause the planet axle to tilt to a speed ratio corresponding to the input. In some embodiments, the rocker gear comprises a rocker gear slot having a first stop face and a second stop face; and the input carrier comprises a stop feature extending axially into the rocker gear slot, wherein: the stop feature contacting the first stop face defines a minimum radial position of the second end of each planet axle, and the stop feature contacting the second stop face defines a maximum radial position of the second end of each planet axle. In some embodiments, the rocker link is rotatably coupled to the rocker gear by a revolute joint. In some embodiments, the rocker link is rotatably coupled to the second end of each planet axle by a spherical joint. In some embodiments, the spherical joint comprises an axle cap on the second end of each planet axle. In some embodiments, the actuator comprises a manual actuator. In some embodiments, the actuator comprises an electromechanical actuator.

Embodiments disclosed herein may be generally directed to a vehicle. The vehicle may comprise a rotational power source and a continuously variable planetary (CVP) transmission. The CVP may comprise: a plurality of planets disposed between a first traction ring and a second traction ring, the plurality of planets arranged around a main shaft defining a main axis of rotation, each planet having a planet axle defining a planet axis of rotation, and an adjusting mechanism comprising: a fixed carrier positioned on a first side of the plurality of planets, the rotatable carrier comprising a first plurality of slots for receiving a first end of each planet axle; a timing plate positioned on a second side of the plurality of planets, the timing plate being grounded to the fixed carrier and comprising a second plurality of slots for receiving a second end of each planet axle; an input carrier positioned on the second side of the plurality of planets, the input carrier grounded to the timing plate; a rocker link comprising a first end rotatably coupled to the first end of the planet axle; a rocker gear rotatably coupled to a second end of the rocker link, and at least one wheel for receiving rotation power from the CVP. The rocker gear may comprise a journal rotatably coupled to the input carrier; and an eccentric pin grounded to the timing plate. A shift driver may be engaged with the rocker gear; and an actuator may be coupled to the shift driver, wherein the actuator provides an input to the shift driver to cause rotation of the shift driver to rotate the rocker gear to translate the rocker link, wherein translation of the rocker link imparts a skew angle on the planet axle to cause the planet axle to tilt to a speed ratio corresponding to the input. In some embodiments, the rocker gear comprises a rocker gear slot having a first stop face and a second stop face; and the input carrier comprises a stop feature extending axially into the rocker gear slot, wherein: the stop feature contacting the first stop face defines a minimum radial position of the second end of each planet axle, and the stop feature contacting the second stop face defines a maximum radial position of the second end of each planet axle. In some embodiments, the rocker link is rotatably coupled to the rocker gear by a revolute joint. In some embodiments, the rocker link is rotatably coupled to the second end of each planet axle by a spherical joint. In some embodiments, the spherical joint comprises an axle cap on the second end of each planet axle. In some embodiments, the actuator comprises a manual actuator. In some embodiments, the actuator comprises an electromechanical actuator. In some embodiments, the vehicle comprises a bicycle.

DETAILED DESCRIPTION OF THE DISCLOSURE

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Continuously Variable Planetary (CVP) Drives—Overview

Figure 1:
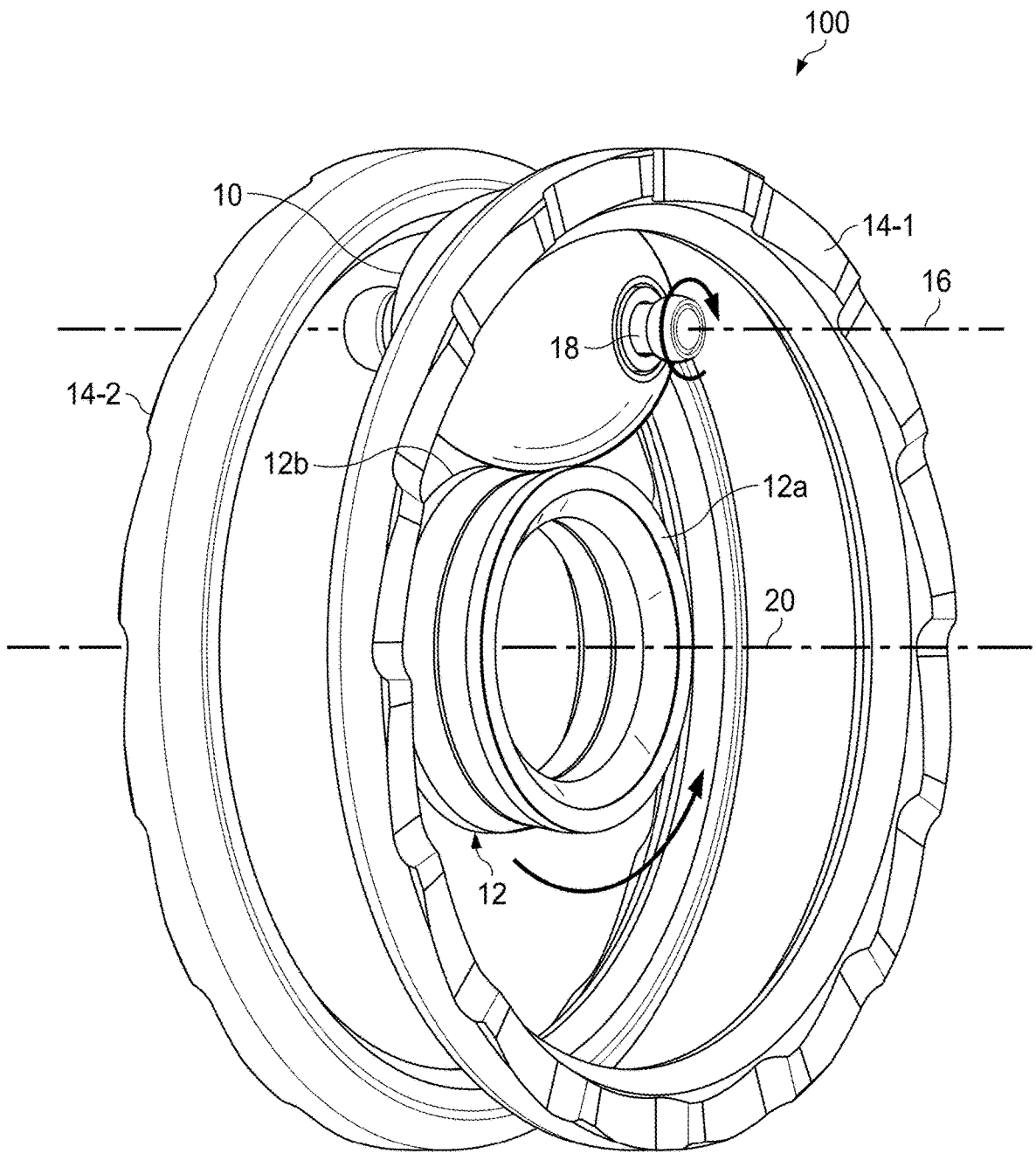
FIG. 1 depicts a perspective view of selected elements of a CVP drive.

Turning to FIG. 1, embodiments of continuously variable planetary (CVP) drive 100 may comprise a plurality of planets 10 arranged around sun assembly 12 and between first ring 14-1 and second ring 14-2. Each planet 10 may rotate about an axis 16 defined by planet axle 18 and each planet 10, sun assembly 12 and first ring 14A and second ring 14B may rotate about central axis 20 defined by a main shaft (not shown in FIG. 1 for simplicity). As depicted in FIG. 1, sun assembly 12 may comprise two sun halves 12A, 12B, which may rotate collectively, independently or according to a differential.

Figure 2:
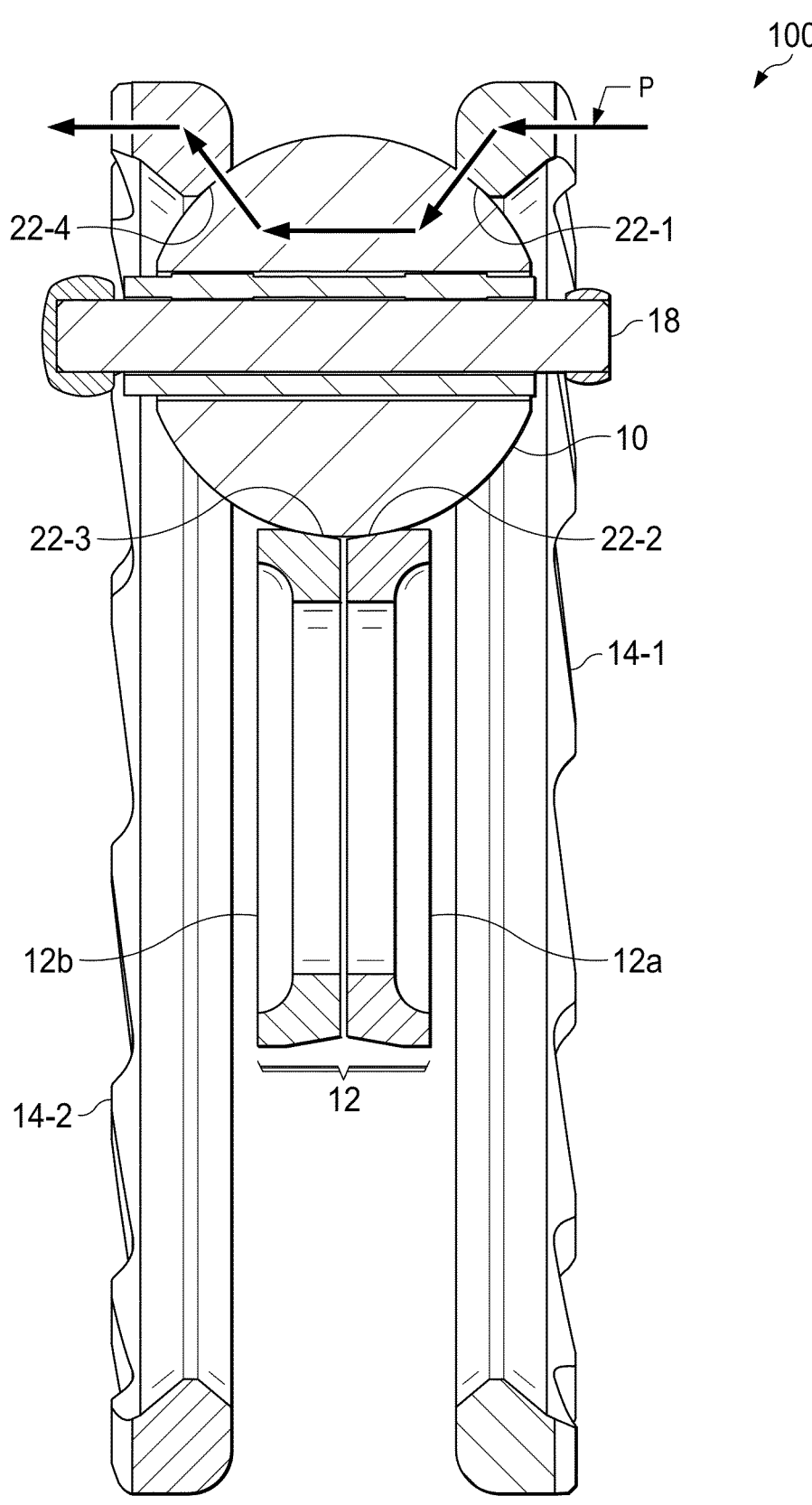
FIG. 2 depicts a sectioned front view of the selected elements depicted in FIG. 1, illustrating power flow through a CVP drive.

Referring to FIG. 2, a typical power flow (P) through CVP 100 may follow a torque path from first traction ring 14-1 through planets 10 to second traction ring 14-2, wherein traction contact points 22 are established between traction rings 14 and planets 10 (e.g., traction points 22-1 and 22-4) and between planets 10 and sun 12 (e.g., traction contact points 22-2 and 22-3).

Speed Ratio

Figure 3B:
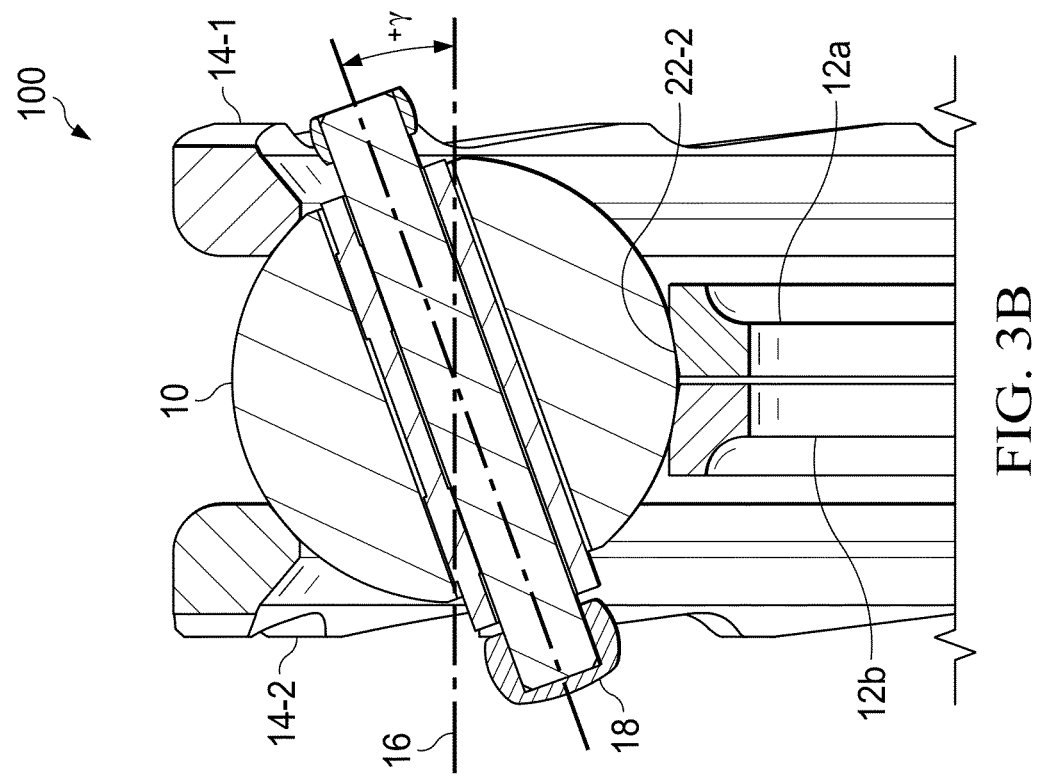
FIGS. 3A, 3B and 3C depict three views of the CVP drive of FIG. 1, illustrating the concept of variable speed operation of a CVP drive due to changes in tilt (gamma angle)
Figure 3A:
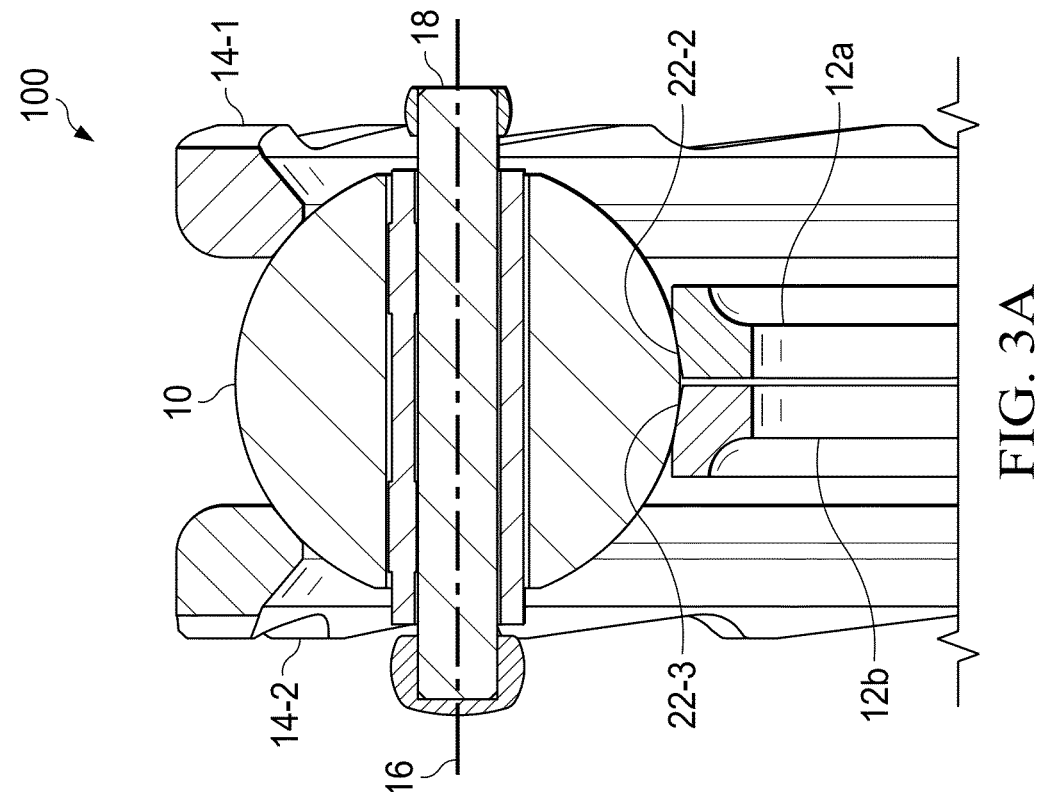
Figure 3C:
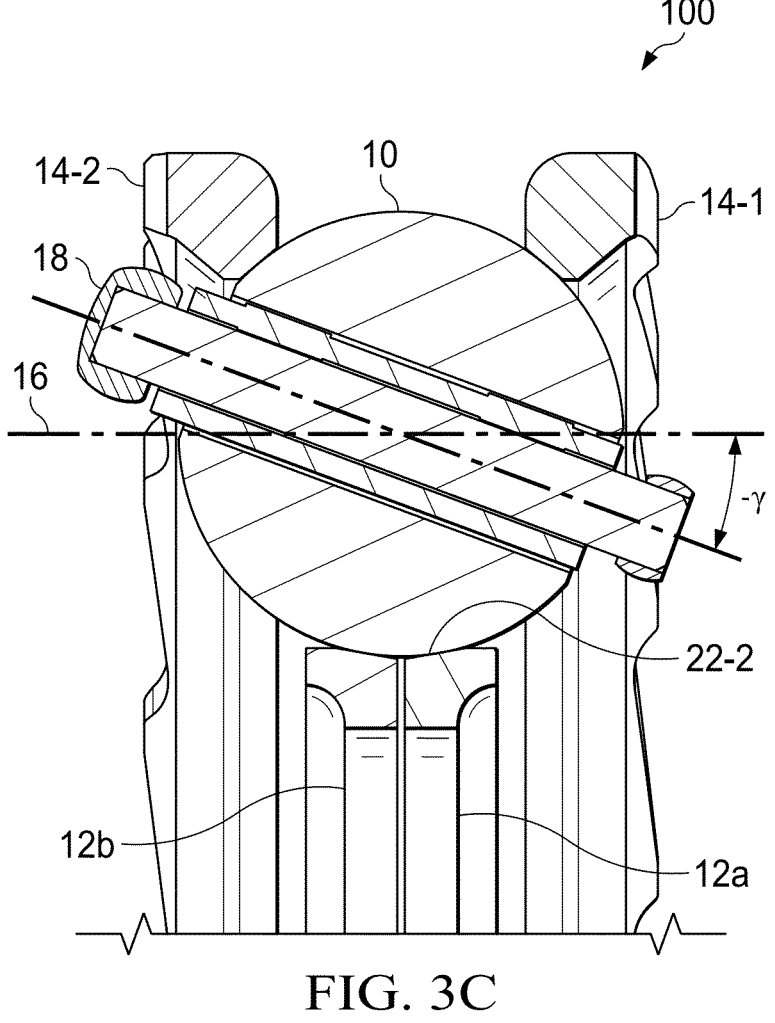

Speed ratio (SR) refers to a ratio of rotational velocity of first ring 14-1 and second ring 14-2, wherein the speed ratio in a CVP drive is determined by an angle of planet axes 16 relative to central axis 20. The speed ratio varies with tilt angle (gamma), which may be adjusted between full underdrive (FUD) to full overdrive (FOD). Referring to FIGS. 3A, 3B and 3C, CVP drive 100 operates under three conditions of speed ratio. In a first condition (e.g., 1:1) depicted in FIG. 3A, planet axes 16 are parallel with central axis 20 such that the speed of second ring 14-2 equals the speed of first ring 14-1. In a second condition (e.g., overdrive), planet axes 16 are angled relative to central axis 20 such that the speed of second ring 14-2 is greater than the speed of first ring 14-1. In a third condition (e.g., underdrive), planet axes 16 are angled relative to central axis 20 such that the speed of second ring 14-2 is less than the speed of first ring 14-1.

Skew Shifting to Adjust a Tilt Angle (Gamma) of the Planets

Figure 4:
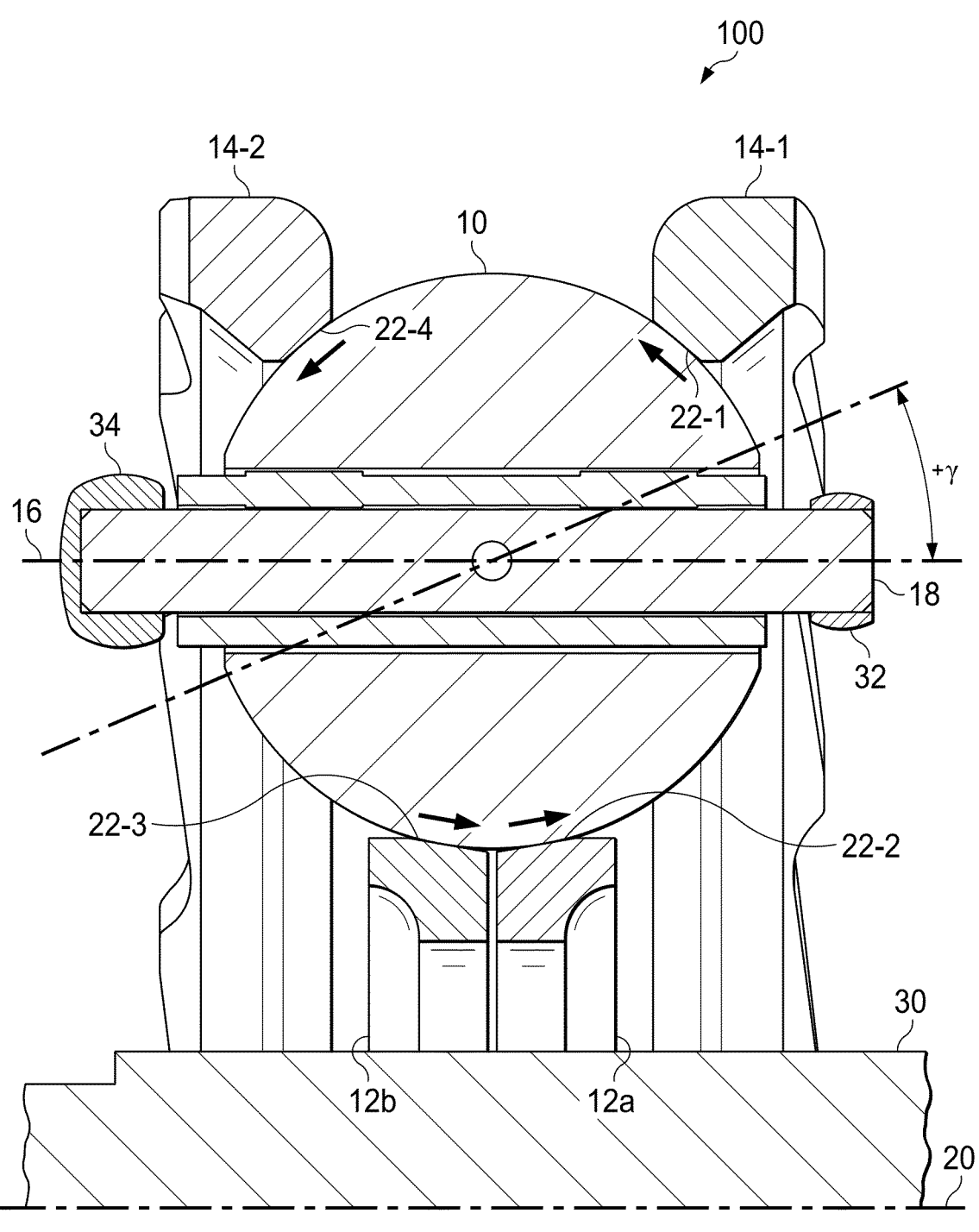
FIG. 4 depicts a close-up sectioned front view of the CVP drive of FIG. 1, illustrating the skew-induced tangential forces generated at contact patches to change a gamma angle of a planet axle.

Referring to FIG. 4, controlling tilt angle (gamma) may be achieved by adjusting a skew angle ((or zeta) to create tangential forces at contact patches 22. When there is a rolling motion at contact points 22 and a positive skew angle is introduced on planets 10, skew-induced side forces develop tangent to the planet surface that act to angularly displace (e.g., tilt) planets 10 in a direction of increasing tilt angle (gamma). For example, referring to FIGS. 4 and 5, when a positive skew angle (zeta) relative to positive rolling motion is introduced, tangential forces are developed on planets 10. Arrows indicate the direction of the skew-induced tangential forces at contact points 22. These tangential forces cause the tilt angle to increase, which causes the speed ratio to increase. Tilt angle and speed ratio continue to increase at a rate related to the rolling speed and the magnitude of the skew angle.

For a speed ratio to be adjusted from a starting value to a different ending steady value, a skew-inducing and subsequent skew-reducing action must occur. This is the function of a skew shift mechanism. The mechanism may induce skew by pushing one or both ends of a planet axle end off-center in the direction of skew. Then, as rolling motion of the traction elements 22 occurs, the planet axle ends move in the gamma direction. As the planet axle ends move in the gamma direction, the shifting mechanism guides the planet axle ends to a near-zero skew state to stop the shifting action. A user may manually (e.g., twist a grip) or electronically (e.g., enter a desired speed ratio, enter a desired level of effort, etc.) provide an input to the skew-inducing mechanism which represents a target speed ratio.

Figure 5:
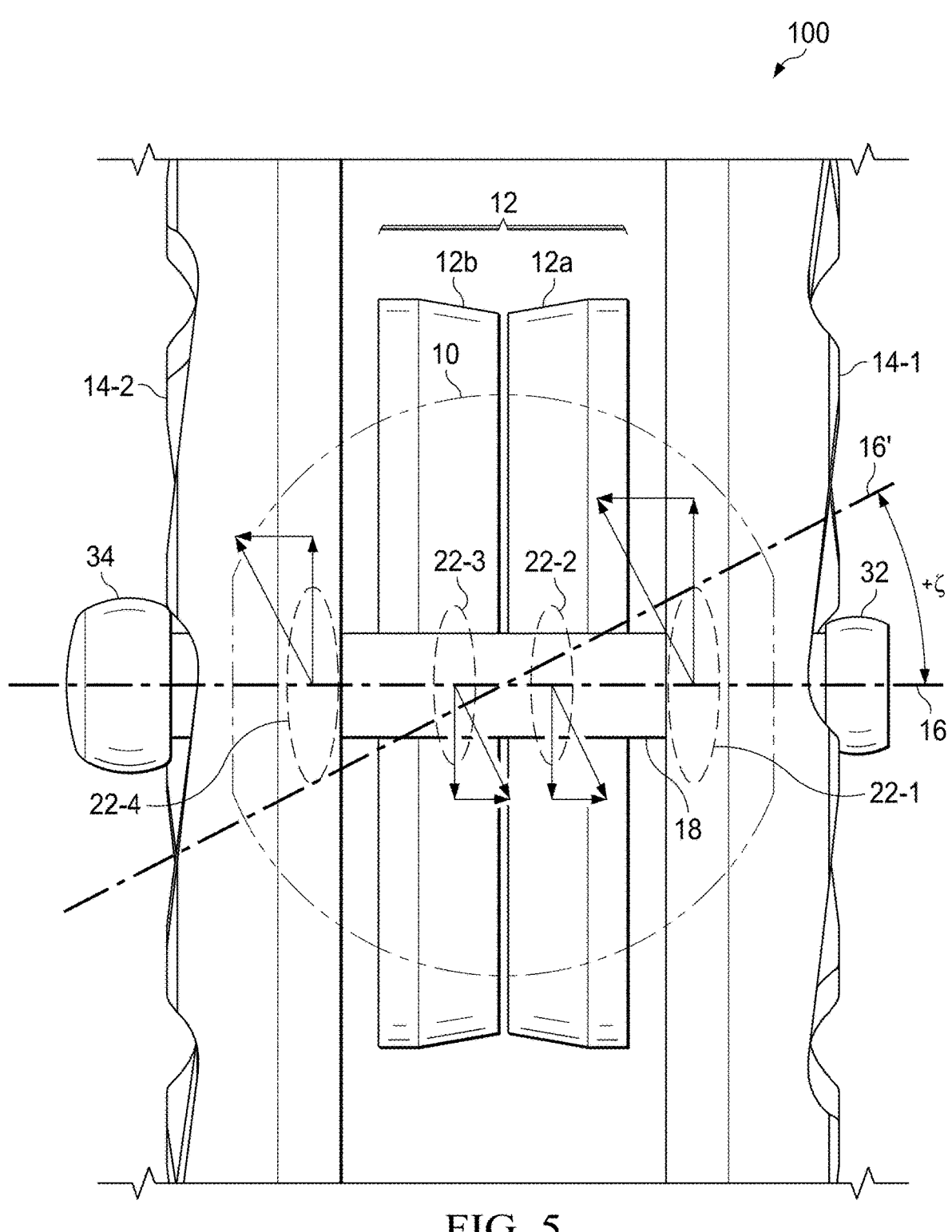
FIG. 5 depicts a close-up partial top view of the CVP drive of FIG. 1, illustrating skew angle between a planet axis and a central axis of the CVP drive and the direction of skew-induced tangential forces acting on the contact points.

Referring to FIG. 5, to stop the changing tilt angle and/or speed ratio, the induced skew angle must be lowered to near zero. If the skew angle is moved in the negative direction, the tilt angle and/or speed ratio will begin to reduce at a rate related to the rolling speed and the magnitude of the skew angle.

Figure 6:
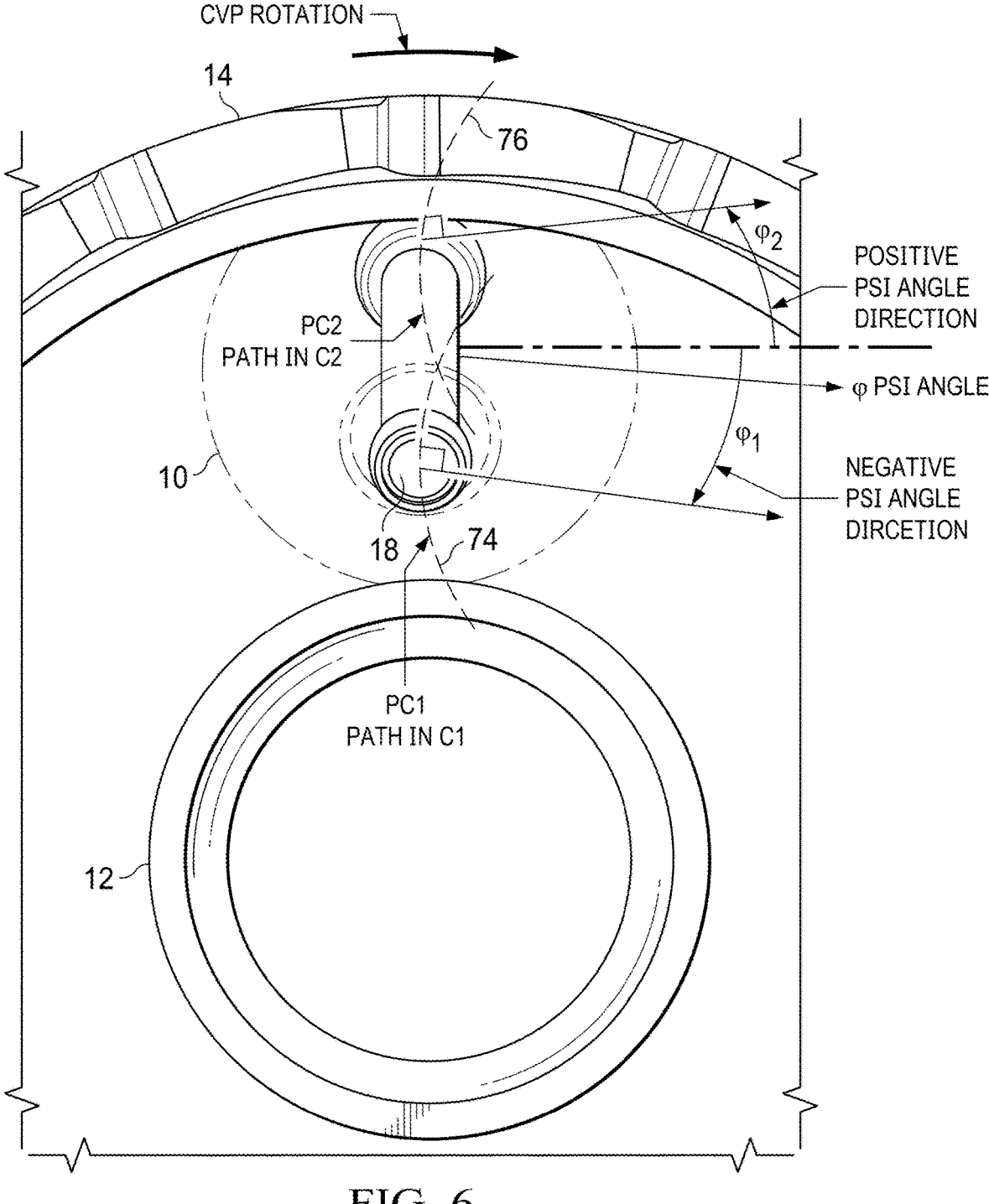
FIG. 6 depicts a close-up partial right side perspective view of the CVP drive of FIG. 1, illustrating psi angle between a planet axis and a central axis of the CVP drive.

A skew input to CVP drive 100 may be associated with a target speed ratio. As the speed ratio changes, the mechanism may automatically reduce the induced skew angle such that a near-zero skew condition is reached at the target speed ratio. Referring to FIG. 6, this automatic skew reducing action may be a positive feedback loop and may be represented by a geometric feature called psi angle, wherein psi angle is a geometric constraint. In other words, when a skew angle is induced in CVP drive 100, the skew angle creates tangential forces to cause the ends of planet axles 18 to translate along one or more of arcs 74 and 76, and the action of changing the tilt angle further results in a reduction in the skew angle. In existing approaches to adjusting speed ratio in a CVP, psi angle may be generated by relative angles between slots in carriers (not shown in FIG. 6). For correct skewing, positive feedback needs to be provided for stable control of speed ratio. Positive feedback depends upon the direction of the traction elements rolling motion. If the CVP's traction elements reverse their rolling direction, the psi angle must also reverse to maintain stable control because the actions of skew reverse. In embodiments disclosed herein, the psi angle is manifested as the line of action of a rocker link element that attaches the planet axle end to a rocker link.

Continuously Variable Planetary Drive with Skew-Based Speed Ration Adjusting Mechanism Embodiments disclosed herein include a CVP drive, a CVP transmission, and a method for adjusting the speed ratio with reduced shift effort, including when operating under high CVP input torque and/or high CVP speed ratio conditions, during static shifting, and during reverse operation (e.g., rollback). Embodiments of a CVP transmission may comprise CVP drive 100 and an eccentric shifting mechanism comprising a rocker link rotatably coupled to an axle end and a rocker body rotatably coupled to the rocker link, wherein rotation of the rocker body actuates the rocker link to impart a skew angle on the planet axle.

Embodiments disclosed herein include a CVP and a method for adjusting the speed ratio with reduced shift effort, including when operating under high CVP input torque and/or high CVP speed ratio conditions. An input to a skew-inducing speed ratio adjusting mechanism may be associated with a target speed ratio. As the speed ratio changes, the mechanism may automatically reduce the induced skew angle (zeta) such that a near-zero skew condition (zeta=near zero) is reached at the target speed ratio. In some embodiments, a person may manually input a skew condition, such as by twisting a grip on a handlebar of a bicycle or use some other manual actuator. In other embodiments, a controller executing a set of instructions may communicate with an actuator such as an encoder to electromechanically input a skew condition. A speed ratio may be adjusted from a starting value to a different ending steady value by way of a first skew-inducing action and a subsequent skew-reducing action. A skew-inducing or skew-reducing action may push one or both ends of planet axles 18 off center and in the direction of skew. As the rolling motion of planets 10 occurs, the ends of planet axles 18 move in the gamma direction. As the axles 18 move in the gamma direction, embodiments guide the planet axles 18 to a near-zero skew state to end the adjusting action.

CVP with a Rocker Link Mechanism to Adjust Speed Ratio

Figure 7:
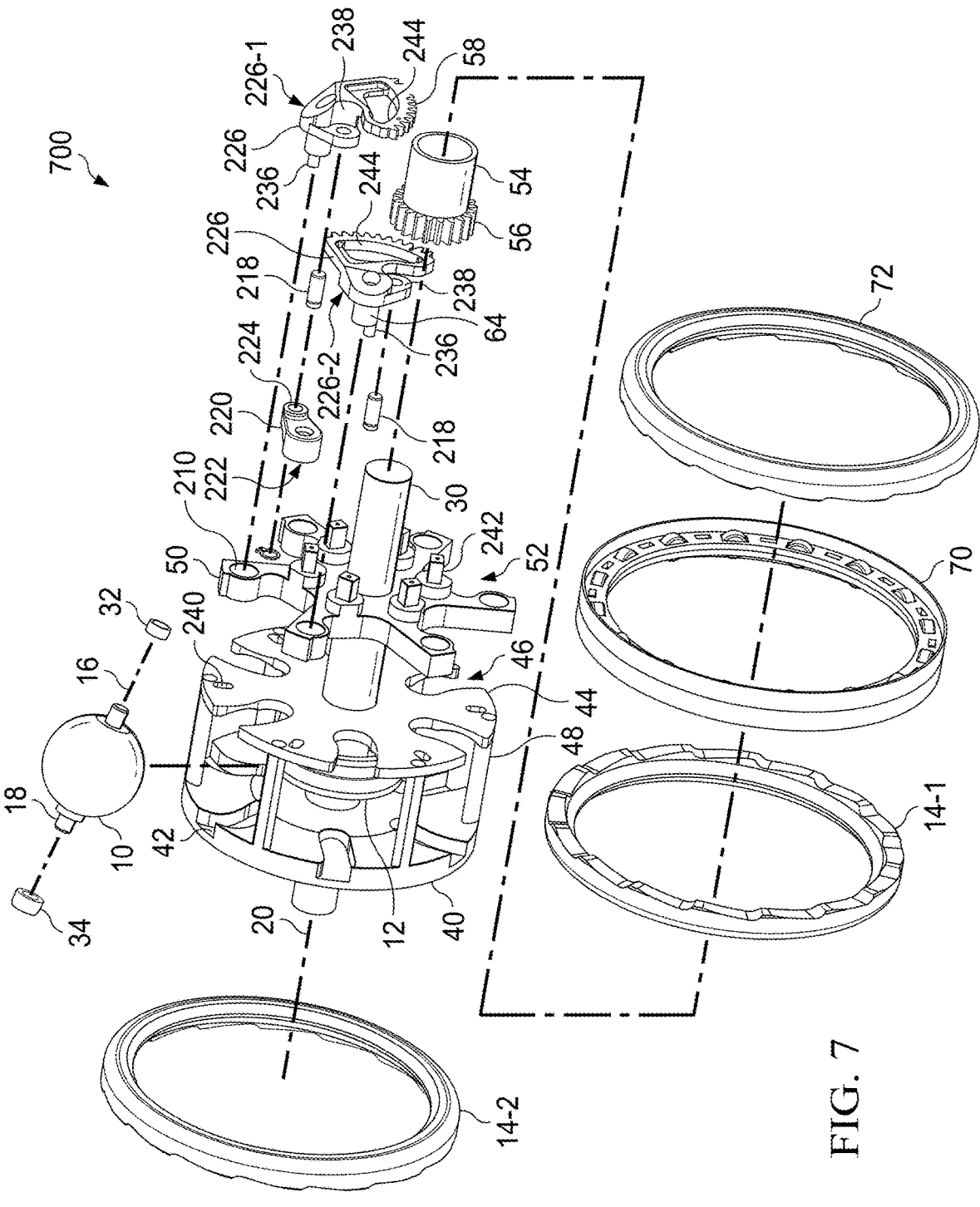
FIG. 7 depicts an exploded perspective view of a CVP drive with one embodiment of an adjusting mechanism with a rocker assembly and a rocker link.

FIG. 7 depicts one embodiment of a CVP transmission 700 comprising CVP drive 100 and one embodiment of a speed ratio adjusting mechanism comprising a rocker gear and a rocker link to adjust a skew angle (zeta), and which can overcome reaction forces and perform fast shifting and static shifting.

CVP transmission 700 may comprise a plurality of planets 10 arranged angularly around main shaft 30 defining central axis 20. Power may enter CVP transmission 700 through axial force generator comprising input ring 72 and roller retainer 70 to first traction ring 14-1. Power may be transferred to planets 10 and exit CVP transmission 700 via second traction ring 14-2, wherein a speed ratio of CVP transmission 700 comprises the speed of second traction ring 14-2 relative to the speed of first traction ring 14-1.

Each planet 10 may rotate around planet axis 16 defined by planet axle 18. Tilting of planet axles 18 determines a speed ratio of CVP drive 100, wherein translation of one or more ends of planet axles 18 in one or more of radial slots 42 in fixed carrier 40 and radial slots 46 in timing plate 44 tilts planet axles 18. Notably, radial slots 42 in fixed carrier 40 and radial slots 46 in timing plate 44 may react to forces caused by tilting planet axles 18 but are not the primary structures for tilting planet axles 18. Instead, a mechanism for adjusting a speed ratio of CVP transmission 700 may comprise rotatable carrier 50, rocker link 220, rocker gear 226 and shift driver 54.

Fixed carrier 40 may be grounded to main shaft 30, timing plate 44 may be grounded to fixed carrier 42 by struts 48 and rotatable carrier 50 may be rotatable around shaft 30. As depicted in FIG. 7, in some embodiments, fixed carrier 40 may be positioned relative to an input side of CVP drive 100. Sun assembly 12 is free to rotate on main shaft 30. Each planet 10 may comprise a bore which houses planet axle 18. In some embodiments, a needle bearing is positioned in the bore between planet 10 and planet axle 18, which allows planet 10 to rotate freely around planet axle 18. A first planet cap 32 and second planet cap 34 may be assembled on each planet axle 18. Planet cap 34 moves along a designed unique radial slot 42 on fixed carrier 40, Planet cap 32 may distribute forces or otherwise facilitate movement of ends of planet axles 18 in radial slots 46 in timing plate 44.

Embodiments disclosed herein manage the ends of planet axles 18 with a wear-resistant mechanism instead of relying on contact between the ends of axles 18 and the walls of radial slots 42 and radial slots 46.

Using a Rocker Link Mechanism to Adjust the Skew Angle of a CVP Transmission

Figure 8:
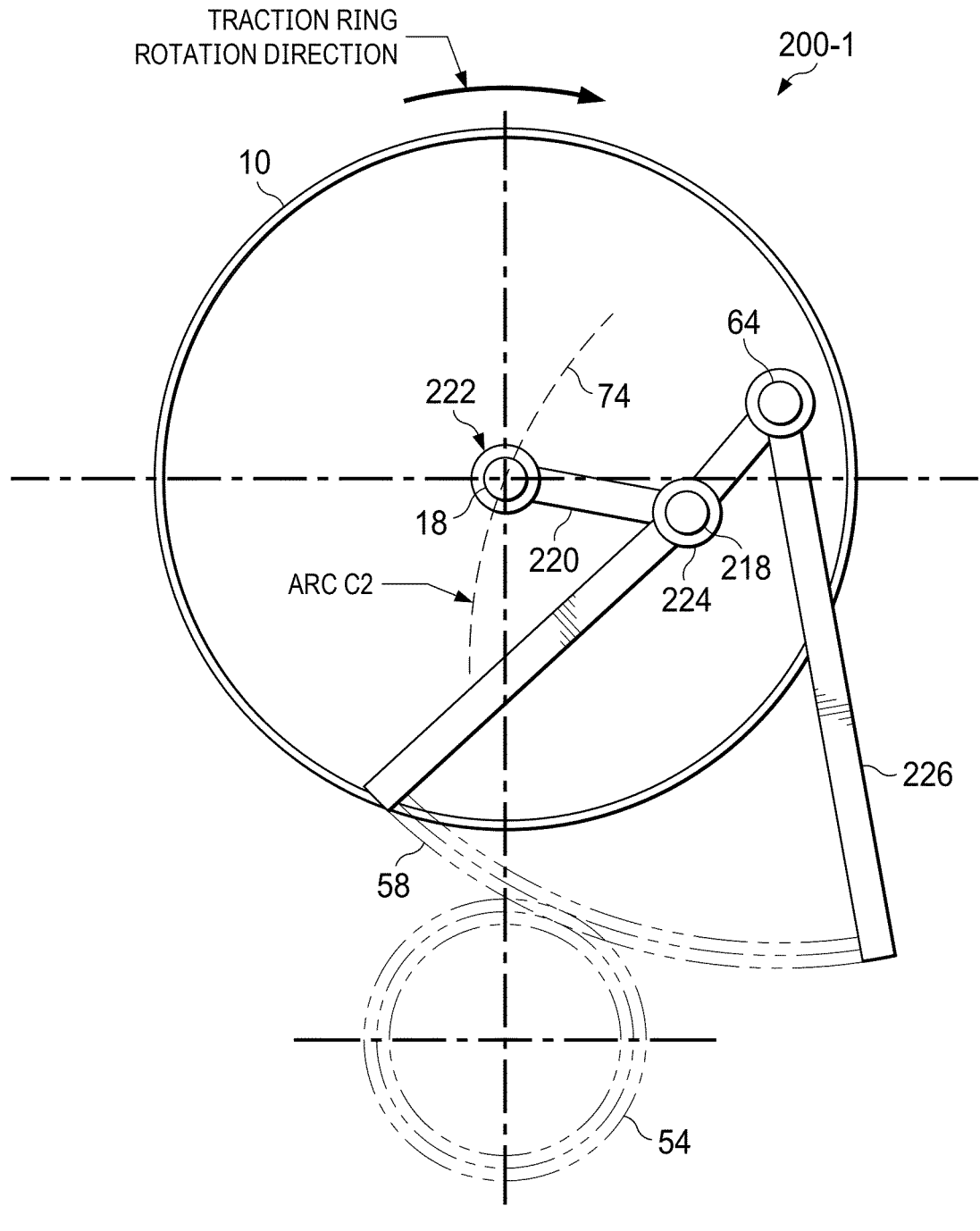
FIG. 8 depicts a concept diagram illustrating one embodiment of a rocker link adjusting mechanism with a rocker assembly anchored to ground.
Figure 9:
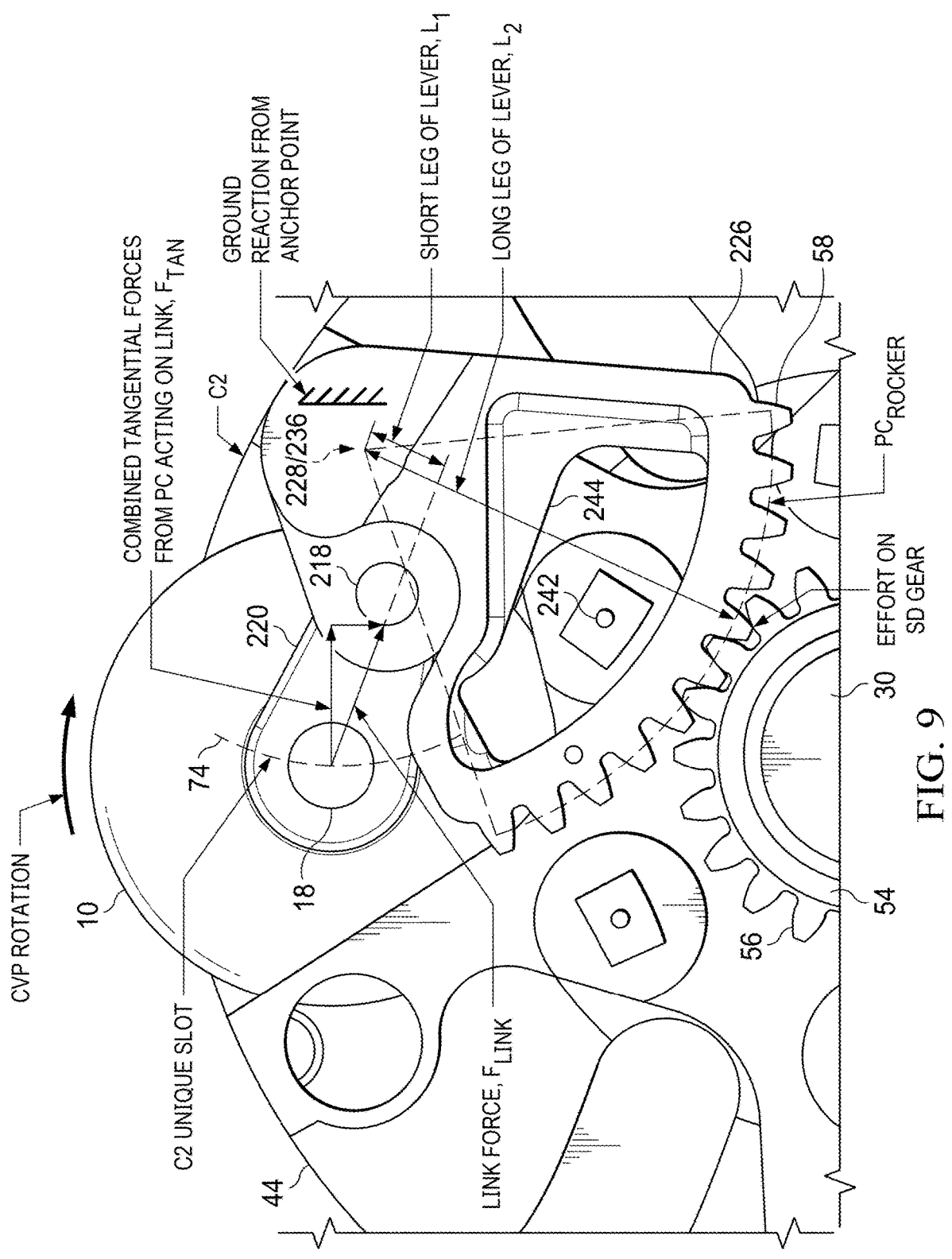
FIG. 9 depicts a close-up side cutaway partial view of a CVP drive, illustrating one embodiment of a speed ratio adjusting mechanism of the CVP drive.

Referring to FIGS. 8-9, some embodiments of a speed ratio adjusting mechanism for CVP transmission 700 may be adjusted using rocker link assembly 200-1. Rocker link assembly 200-1 comprises rocker link 220 coupled at a first end 222 to an end of a planet axle 18 and coupled at a second end 224 to rocker gear 226. A first end of rocker gear 226 may comprise journal 64 positioned in passage 210 of carrier 50 and a second end of rocker gear 226 may comprise teeth 58 to engage with teeth 56 of shift driver 54.

Figure 10A:
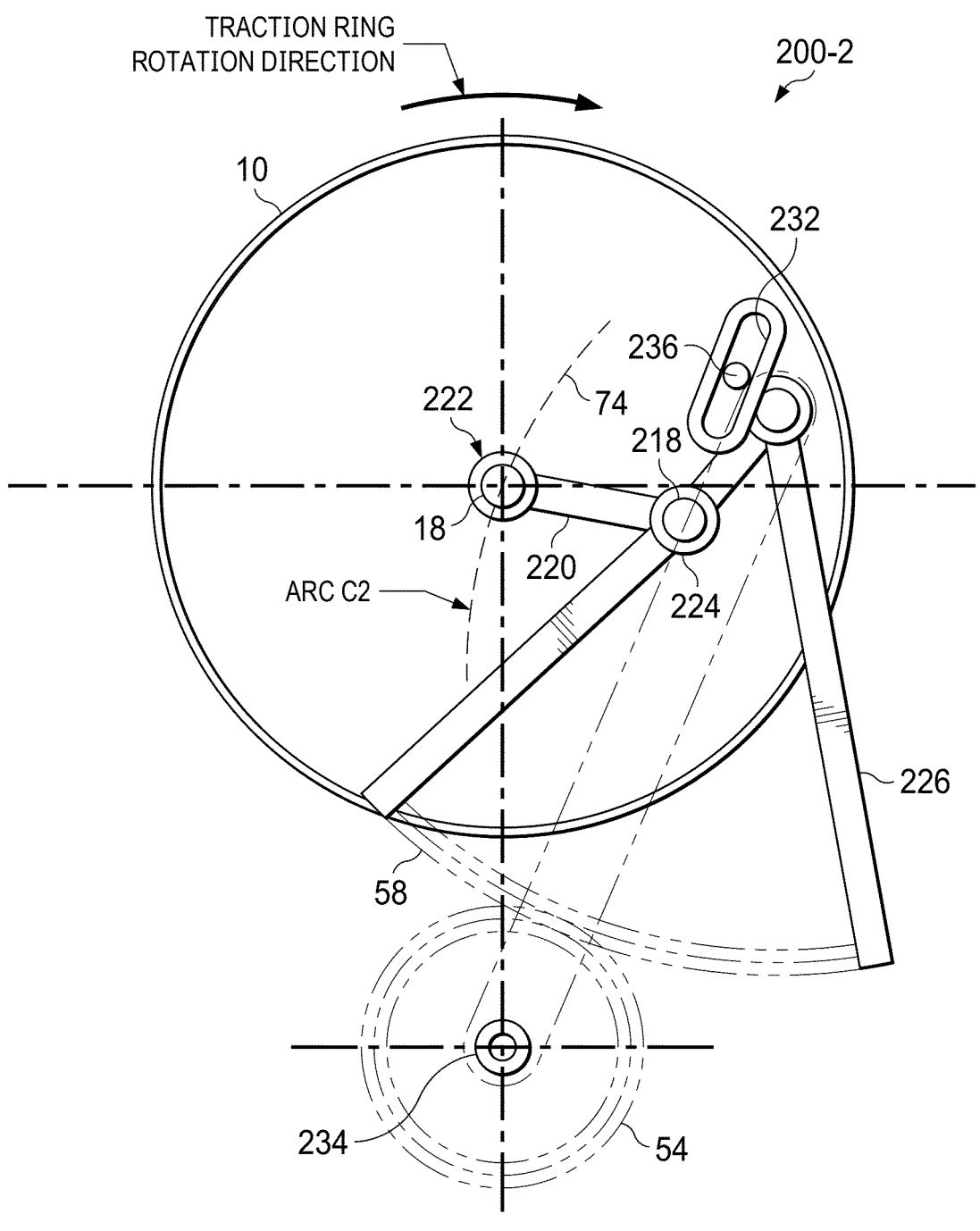
FIG. 10A depicts a concept diagram illustrating one embodiment of a rocker link adjusting mechanism with a rocker assembly anchored to a floating carrier.
Figure 10B:
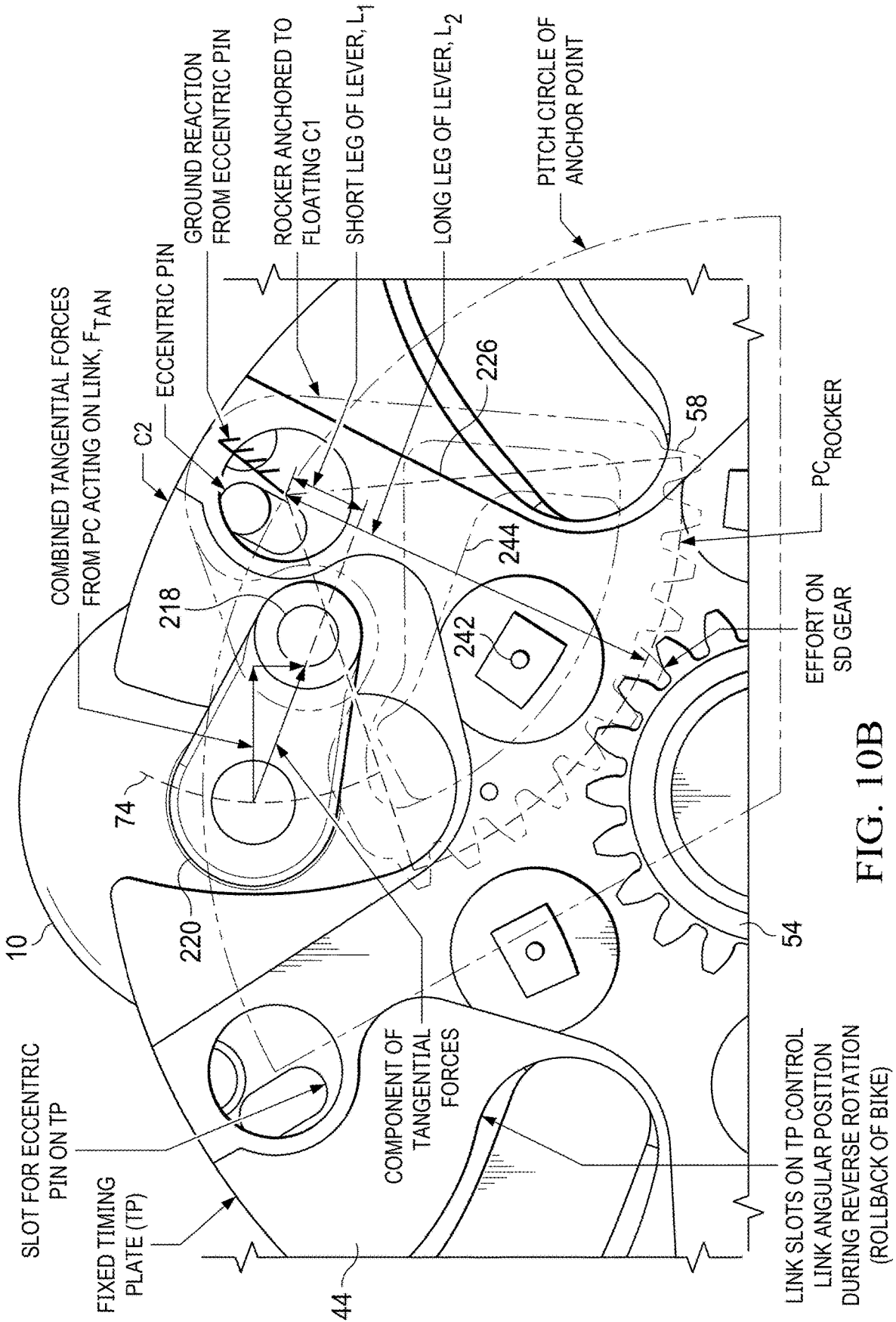
FIG. 10B depicts a close-up side cutaway partial view of a CVP drive, illustrating one embodiment of a speed ratio adjusting mechanism of the CVP drive.
Figure 10C:
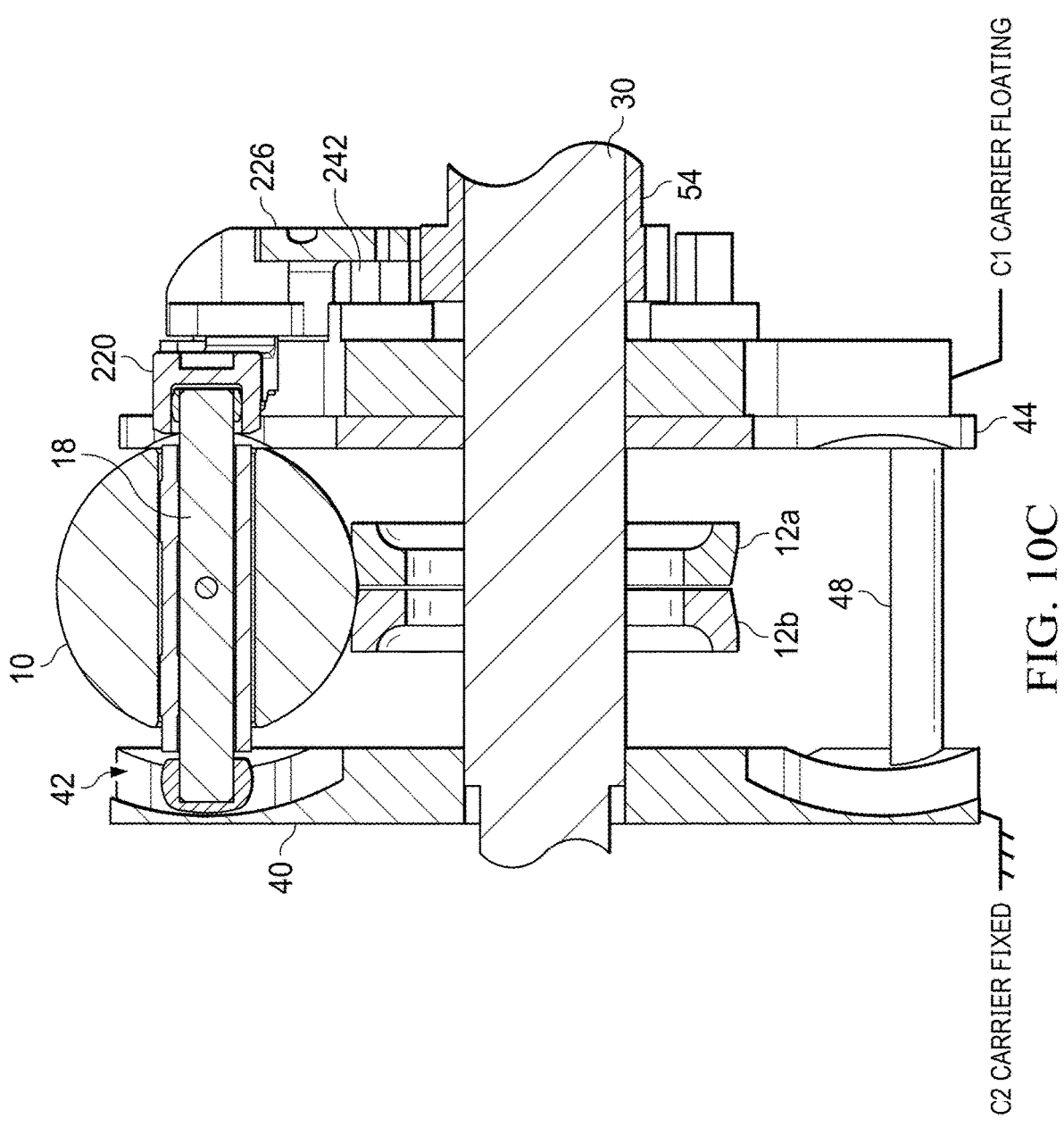
FIG. 10C depicts a partial front view of the CVP drive of FIG. 10B, illustrating a floating carrier.

Referring to one or more of FIGS. 10A-10C, some embodiments of a speed ratio adjusting mechanism for CVP transmission 700 may be adjusted using rocker link assembly 200-2. Rocker link assembly 200-2 comprises rocker link 220 coupled at a first end 222 to an end of a planet axle 18 and coupled at a second end 224 to rocker gear 226. A first end of rocker gear 226 may comprise journal 64 positioned in passage 210 of carrier 50 and a second end of rocker gear 226 may comprise teeth 58 to engage with teeth 56 of shift driver 54.

Eccentric pin 236 extending from journal 64 may be positioned in slots 232 in timing plate 44 to act as a fulcrum. Features 242 formed on carrier 50 may extend through openings 244 in rocker gear 226 to limit the range of speed ratio.

In operation, rotation of shift driver 54 with teeth 56 engaging teeth 58 on rocker gear 226 causes rotation of rocker gear 226 around journal 64, and rotation of rocker gear 226 around journal 64 causes translation of rocker link 220 to impart a skew angle on planet axle 18, wherein rotation of elements creates tangential forces to adjust tilt angle (gamma) (e.g., causing an end of a planet axle 18 to travel along arc path 74).

Rocker link 220 may comprise first end 222 configured for a first rotatable coupling to an end of planet axle 18 and second end 224 configured for a second rotatable coupling to rocker gear 226. In some embodiments, first end 222 may comprise a spherical joint and second end 224 may comprise a revolute joint around pin 218. Eccentric pin 236 may be rotatably coupled to ground, such as to a carrier (discussed in greater detail below).

Embodiments Overcome Reaction Forces

Tilting of planet axles 18 is achieved using a speed ratio adjusting mechanism, which is commonly called a shifting mechanism. This mechanism must overcome reaction forces generated by traction elements 22. The shifting effort is approximately proportional to the CVP input torque. At a constant CVP input torque, the shifting effort varies with speed ratio. A typical shifting mechanism is actuated using mechanical or electromechanical methods. However, in the case of mechanically operated methods, the user effort required to shift under high CVP input torque can be significant and can exceed human effort ability. For electromechanical systems, in cases of high CVP input torque, the system can be overloaded, compromising shift performance or exceeding the capacity of the electromechanical actuator device. In the e-bike industry, speed-pedelec bikes are moving towards more powerful motors with increased torque. The CVP's in such use cases are operated at higher CVP input torque conditions, and consequently require more shift effort.

FIG. 9 depicts one embodiment of a CVP 100 with the embodiment of rocker link mechanism 200-1, illustrating how tangential forces ($F_{TAN}$) may be transferred from the ends of planet axles 18 through link 220 connected to rocker gear 226. These forces may be reacted by rocker gear 226 which is grounded (e.g., grounded using journal 64). Notably, a tangential force ($F_{TAN}$) is a component of a force ($F_{LINK}$) along rocker link 220, wherein a line of action of the link force ($F_{LINK}$) is at a length (L1) from an anchor point (e.g., anchor point 228/236 centered in journal 64). When shift driver 54 rotates, the shift force applied by shift driver teeth 56 to rocker gear 226 is applied a length (L2) between the pitch circle of rocker gear 226 ($PC_{ROCKER}$) and anchor point 228/236. Since L2 is greater than L1 for all speed ratios, embodiments have a higher lever ratio, resulting in decreased effort to adjust the speed ratio. Furthermore, the lever ratio increases as the speed ratio increases.

Referring to FIGS. 10A-10C, some embodiments of a shift mechanism for a CVP drive comprise rocker link mechanism 200-2 having rocker gear 226 grounded via eccentric pin 236 to a floating carrier at a first end. Rocker gear 226 may engage with shift driver 54 at a second end and further couple to planet axle 18 with rocker link 220, wherein rotation of shift driver 54 causes rotation of rocker gear 226 around journal 64, and rotation of rocker gear 226 around journal 64 causes translation of rocker link 220 to adjust an end of a planet axle 18 along path 74. Rocker link 220 may comprise first end 222 configured for a first rotatable coupling to an end of planet axle 18 and second end 224 configured for a second rotatable coupling to rocker gear 226. In some embodiments, first end 222 may comprise a spherical joint and second end 224 may comprise a revolute joint around pin 218. Eccentric pin 236 may ground rocker assembly 226 to timing plate 44 and journal 64 may form a revolute joint.

In operation, rotation of shift driver 54 with teeth 56 engaging teeth 58 on rocker gear 226 causes rotation of rocker gear 226 around journal 64, and rotation of rocker gear 226 around journal 64 causes translation of rocker link 220 to impart a skew angle on planet axle 18, wherein rotation of elements creates tangential forces to adjust tilt angle (gamma) (e.g., causing an end of a planet axle 18 to travel along arc path 74).

Figure 11:
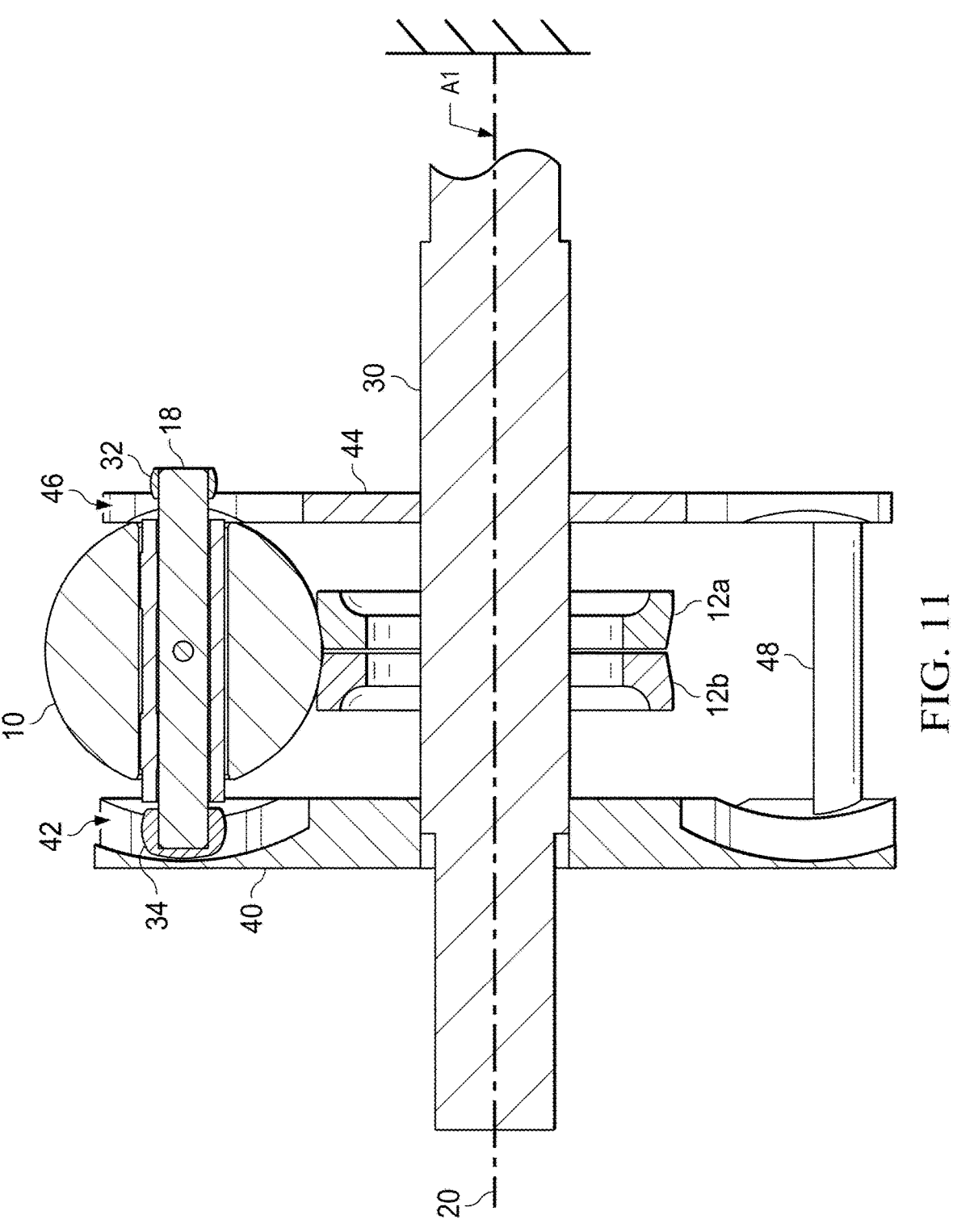
FIG. 11 depicts a partial front view of the CVP drive of FIG. 7, illustrating a timing plate grounded to a fixed carrier and the movement of axle caps in unique slots in a fixed carrier.

FIG. 11 depicts a partial front view of CVP drive 100 with timing plate 44 grounded to fixed carrier 40 using struts 48. Planet 10 rotates around planet axle 18 and sun assembly 12 rotates around main shaft 30 defining central axis 20, wherein sun assembly may comprise two halves 12a and 12b. Planet axle 18 may comprise cap 32 on a first end for translating in slot 46 in timing plate 44. Planet axle 18 may comprise cap 34 on a second end for translating in slot 42 in fixed carrier 40. In some embodiments, main shaft 30 is grounded.

Figure 12:
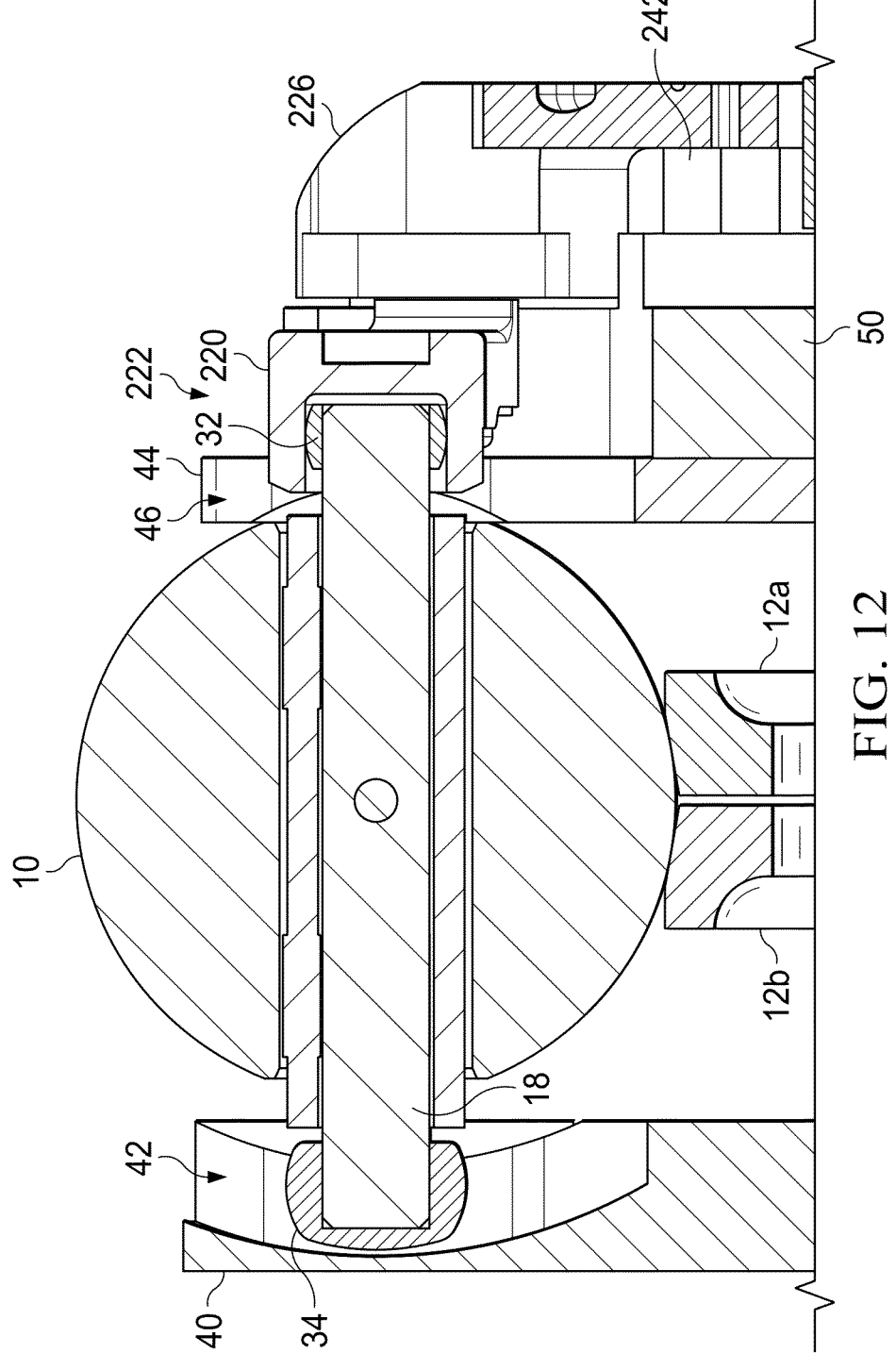
FIG. 12 depicts a close-up partial view of the CVP drive of FIG. 7, illustrating a rocker link rotatably coupled to an end of a planet axle with a spherical joint and a second end of the planet axle in a unique slot.

Referring to FIGS. 7 and 12, a first end of planet axle 18 may be rotatably coupled to a first end 222 of rocker link 220 (including coupling end cap 32 to first end 222). In some embodiments, a spherical joint may comprise first axle cap 32 positioned in first end 222 of rocker link 220. Rocker link 220 may move first end of planet axle 18 in slot 46 of timing plate 44, wherein second end of planet axle 18 may be free to translate along radial slots 42 in fixed carrier 40 until CVP drive 700 achieves a gamma angle corresponding to a desired speed ratio. Rotation of rocker gear 226 (and therefore translation of first end of planet axle 18) may be constrained by feature 242, discussed in greater detail below.

Figure 13:
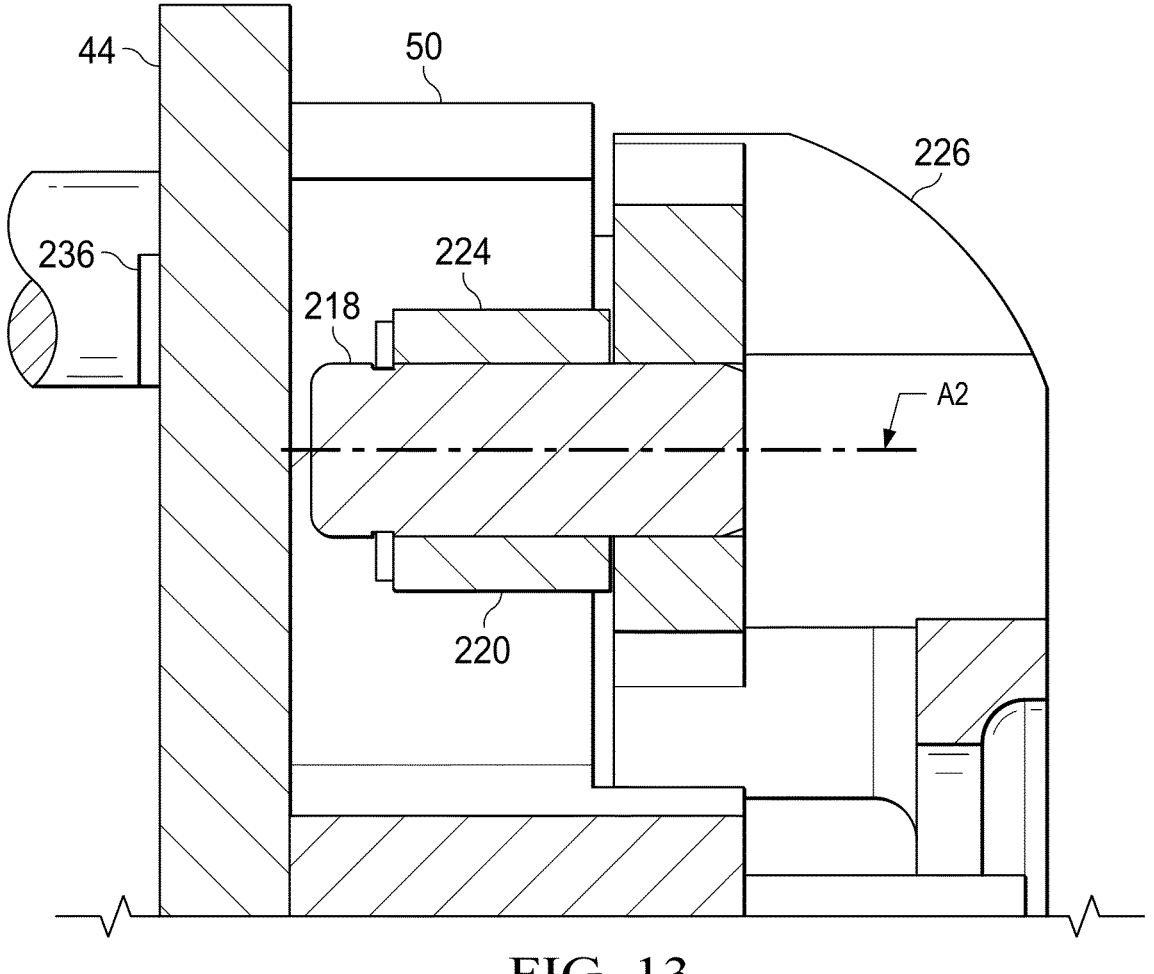
FIG. 13 depicts a closeup partial cutaway view of one embodiment of a CVP drive with a second end of a rocker link coupled to a rocker assembly by a cylindrical pin forming a revolute joint around axis A2.

Referring to FIGS. 7 and 13, a second end 224 of rocker link 220 may be rotatably coupled to rocker body 226. As depicted in FIG. 13, a cylindrical pin 218 may couple rocker link 210 to rocker body 226, forming a revolute joint defining axis A2.

Figure 14:
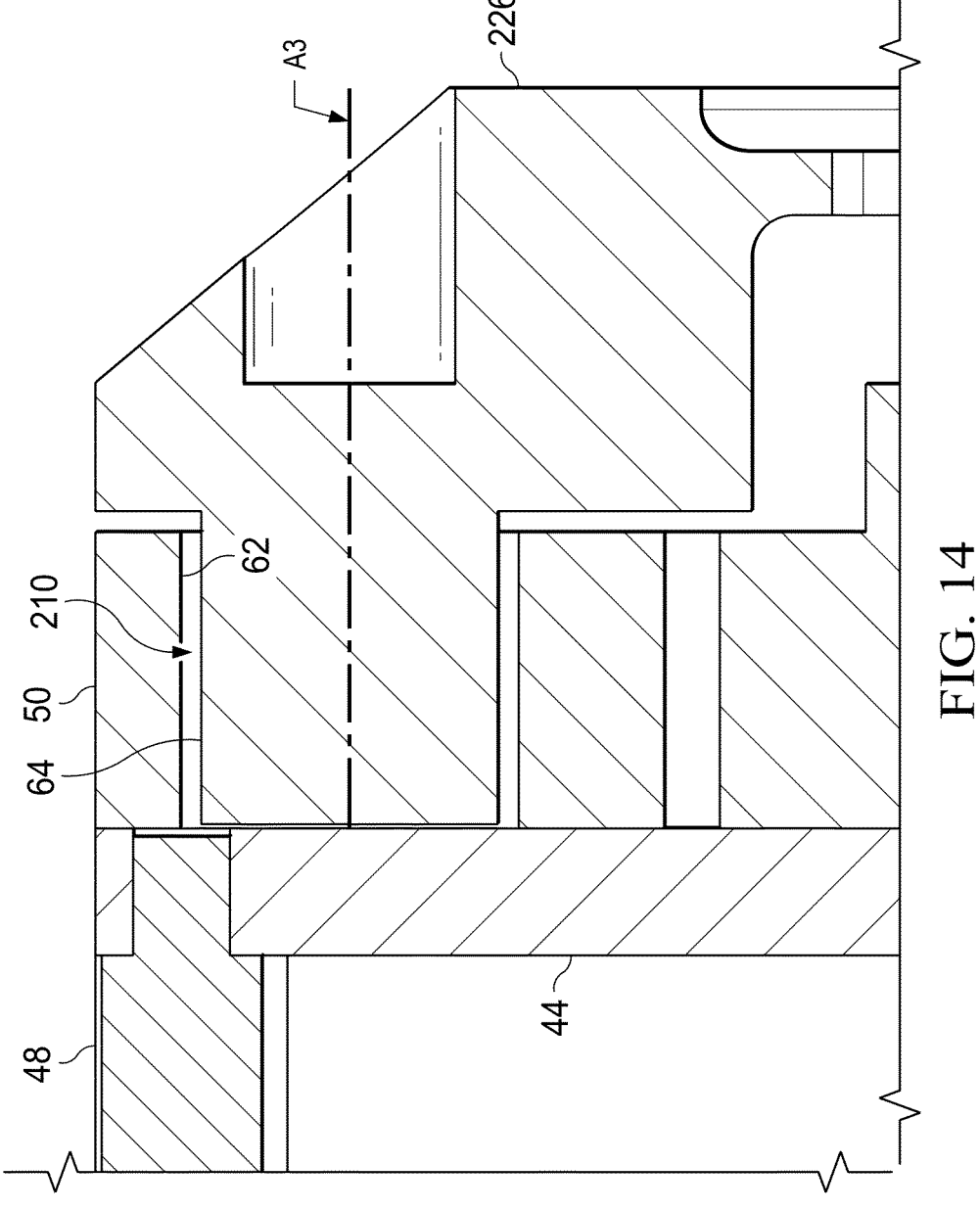
FIG. 14 depicts a closeup cutaway front view of one embodiment of a CVP drive with a rocker assembly rotatably coupled to a carrier by a portion of the rocker assembly forming a revolute joint around axis A3.

Referring to FIGS. 7 and 14, rocker gear 226 may be configured for rotation relative to carrier 50. In some embodiments, rotatable carrier 50 may comprise passage 210 and rocker gear 226 may comprise cylindrical journal 64, wherein positioning journal 64 in passage 210 allows rotation of rocker gear 226 relative to carrier 50 around axis A3.

Figure 15:
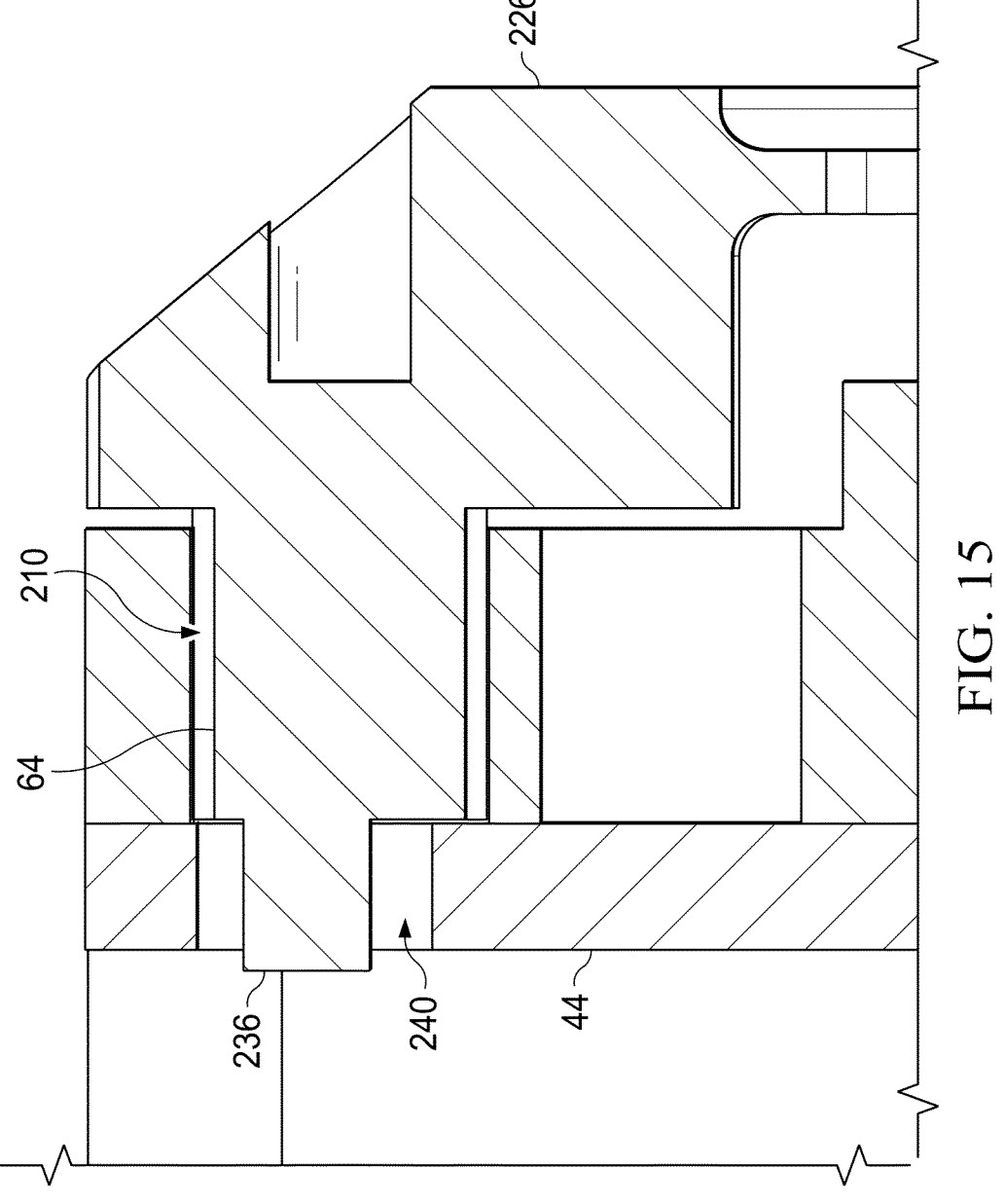
FIG. 15 depicts a closeup cutaway front view of one embodiment of a CVP drive with an eccentric pin forming a fulcrum for a speed ratio shifting mechanism.

Referring to FIGS. 7 and 15, rocker gear 226 may comprise eccentric pin 236 extending from journal 64 for grounding rocker gear 226 to timing plate 44. In some embodiments, eccentric pin 236 may be positioned in timing plate slot 240, allowing eccentric pin 236 to translate radially.

Figure 16:
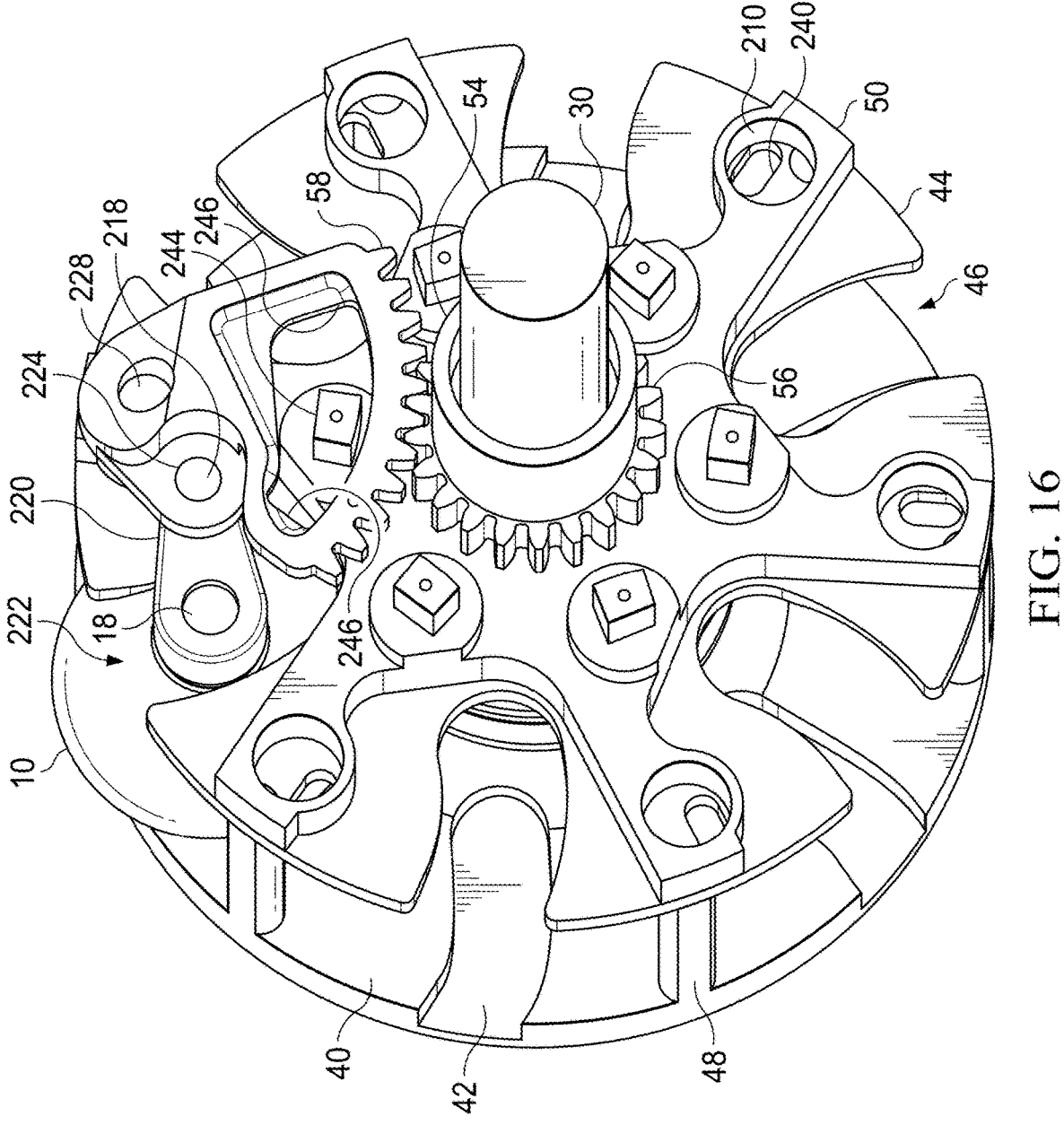
FIG. 16 depicts a perspective view of one embodiment of a CVP drive with features for maintaining operation of the CVP within a set of operating specifications.

FIG. 16 depicts a partial perspective view of CVP drive 700 with one embodiment of a speed ratio adjusting mechanism for planet 10 disposed between fixed carrier 40 and timing plate 44. Shift driver 54 may be rotated an angle around main shaft 30. Shift driver gears 56 may impart a force or action through rocker gear teeth 58 to cause rocker gear to rotate about point 228 (which may correspond to journal 64 positioned in passage 210), wherein eccentric pin 236 positioned in timing plate slot 240 may act as a fulcrum. Rotation of rocker gear 226 may cause translation of rocker link 220 to impart a skew angle on planet axle 18, causing ends of planet axle 18 to translate in slots 42, 46 to tilt planet axle 18.

Figure 17A:
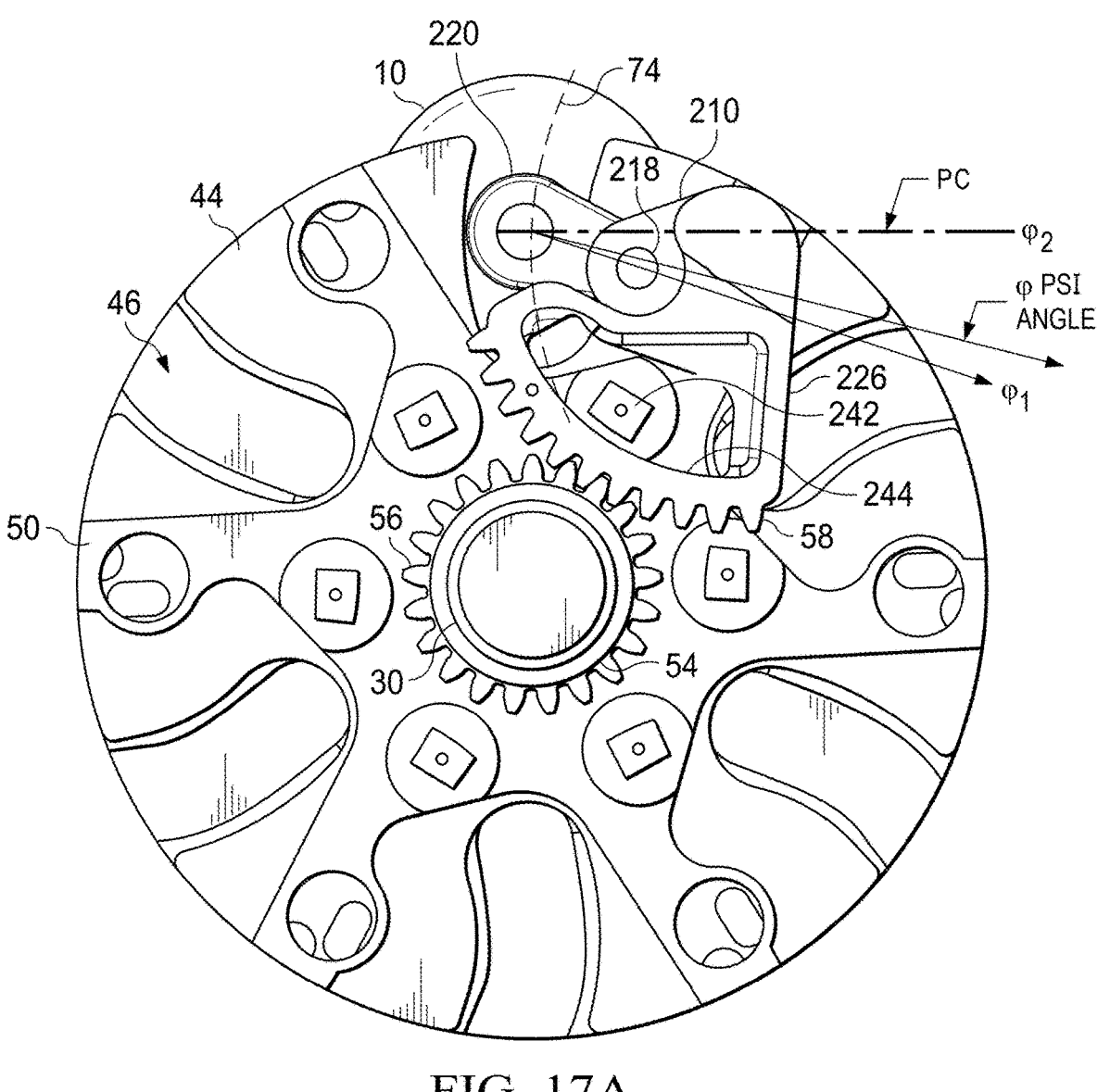
FIGS. 17A, 17B and 17C depict end views of one embodiment of a CVP drive configured for variable speed operation of a CVP drive due to changes in tilt, at 1:1 operation, underdrive operation and overdrive operation.
Figure 17B:
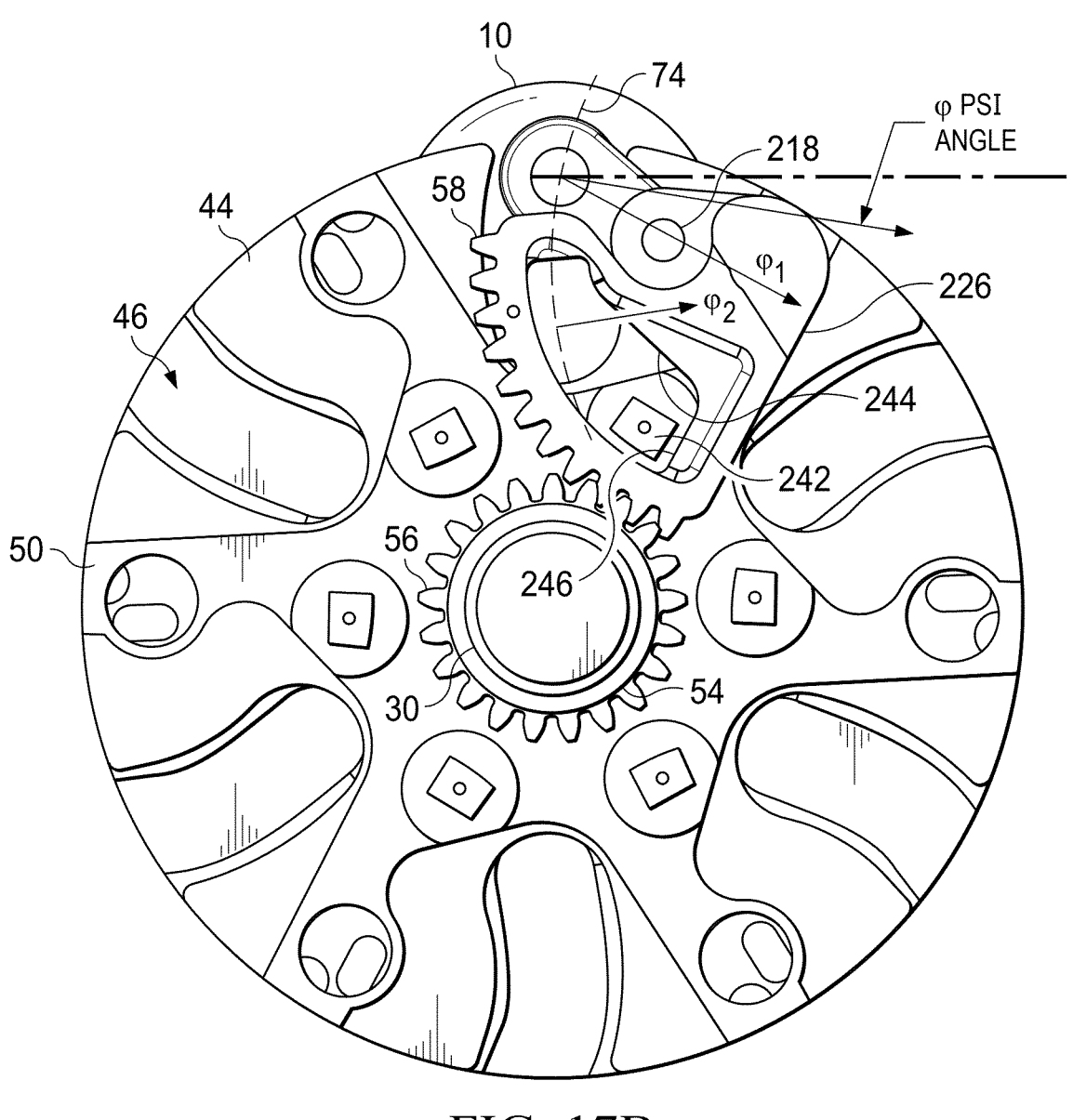
Figure 17C:
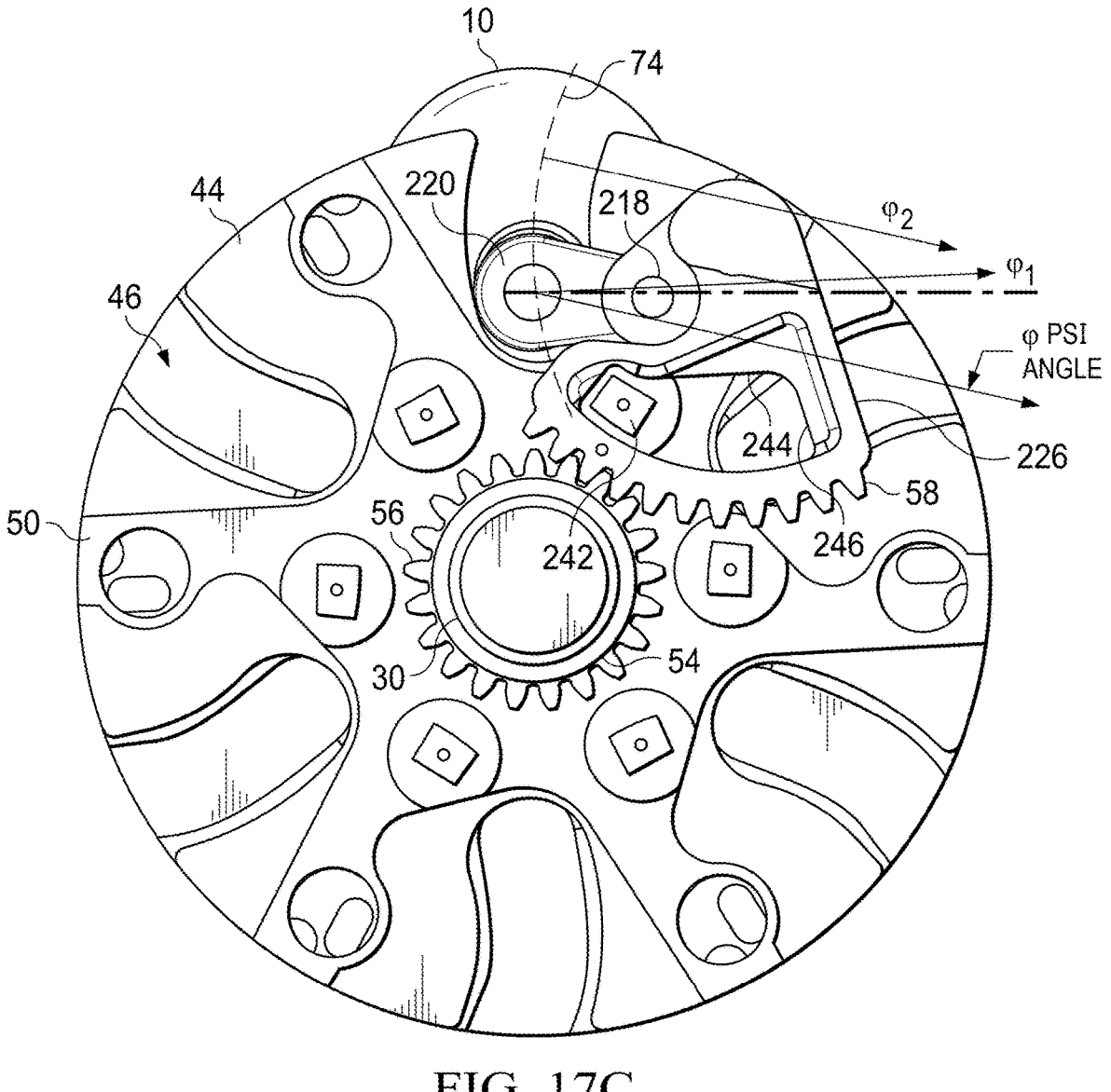

FIGS. 17A, 17B and 17C depict partial side views of CVP drive 700 (with traction rings 14 and components of an axial force generator not shown). In FIG. 17A, rocker gear 226 is positioned such that feature 242 is approximately in the middle of rocker gear slot 244, corresponding to a speed ratio of 1:1. In FIG. 17B, rocker gear 226 is rotated such that stop face 246 is near feature 242 of rocker gear slot 244, corresponding to overdrive operation in which a speed of second traction ring 14-2 is greater than a speed of first traction ring 14-1. In FIG. 17C, rocker gear 226 is positioned such that feature 242 is near a second stop face 246 of rocker gear slot 244, corresponding to underdrive operation in which a speed of second traction ring 14-2 is less than a speed of first traction ring 14-1. In all three cases, psi angle is negative, resulting in a positive feedback loop.

Static Shifting

Static shifting occurs when the gamma angle is adjusted without rolling motion of the traction elements. Shift driver 54 is rotated which articulates rocker assembly 226, pushing or pulling the planet axle ends in a tangential and radial direction. This displaces the axle end until the feature 242 on carrier 50 contacts stop faces 246 in rocker gear slot 244. Continued effort applied to shift driver 54 slides eccentric pin 236 along the timing plate slots 240 which radially displaces the axle end. Radial displacement of the axle end "brute force" changes the gamma angle. The effort required to shift in this condition depends upon the traction contact normal loads as well as sliding friction in rocker assembly 226. In contrast, existing designs function similarly but the geometric layout results in binding and thus cannot shift full range in a non-rolling condition. Binding occurs because of geometry and is increased because of typical friction in the mechanism. Static shifting is important because in bicycle applications, this can be thought of as user trying to shift the CVP speed ratio when the bicycle is not in motion (e.g., downshifting when the bicycle is stopped), Simulations and Results Embodiments of CVP drive 700 were modelled to compute the shift forces at the shift driver 54. A model of CVP drive 700 was also constructed in Automatic Dynamic Analysis of Mechanical Systems (ADAMS) computer simulation. Data from these simulations are compared with existing CVP shifting systems that use skew shifting based on carriers with radially offset slots to analyze various performance parameters.

Dynamic Shifting

FIGS. 18-22 depict graphs illustrating simulation results corresponding to dynamic shifting of embodiments of a speed ratio adjusting mechanism on a CVP drive 700. As used herein, FUD corresponds to full underdrive and FOD corresponds to full overdrive.

Figure 18:
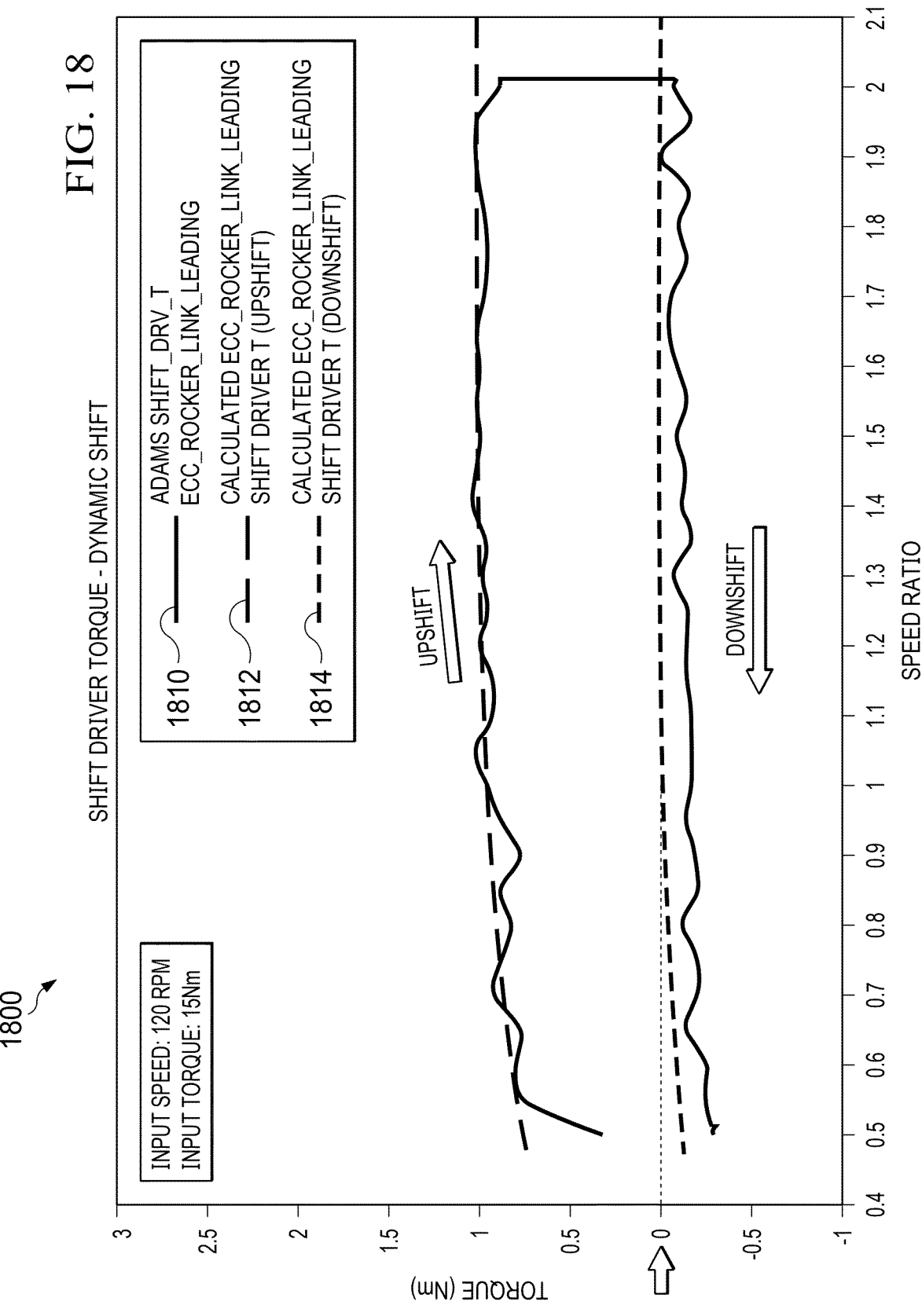
FIG. 18 depicts a graph illustrating shift driver torque vs speed ratio for the embodiment of a CVP drive depicted in FIG. 7 during upshifting and downshifting.

Turning to FIG. 18, chart 1800 depicts an ADAMS simulation and calculations of a shift driver torque vs speed ratio adjusted at a constant input speed and torque. For chart 1800, an input torque is held constant at 15 Nm, an input speed is held constant at 120 rpm, and the rotation of shift driver 54 is time-based (e.g., 15 seconds for upshifting (FUD→1:1→FOD) and 15 seconds for downshifting (FOD→1:1→FUD)) to simulate a user gradually shifting the transmission during constant cadence riding. Line 1810 depicts an ADAMS simulation of shift driver torque in both upshift and downshift. Line 1812 depicts a calculated shift driver torque for upshifting and line 1814 depicts a calculated shift driver torque for downshifting.

Figure 19:
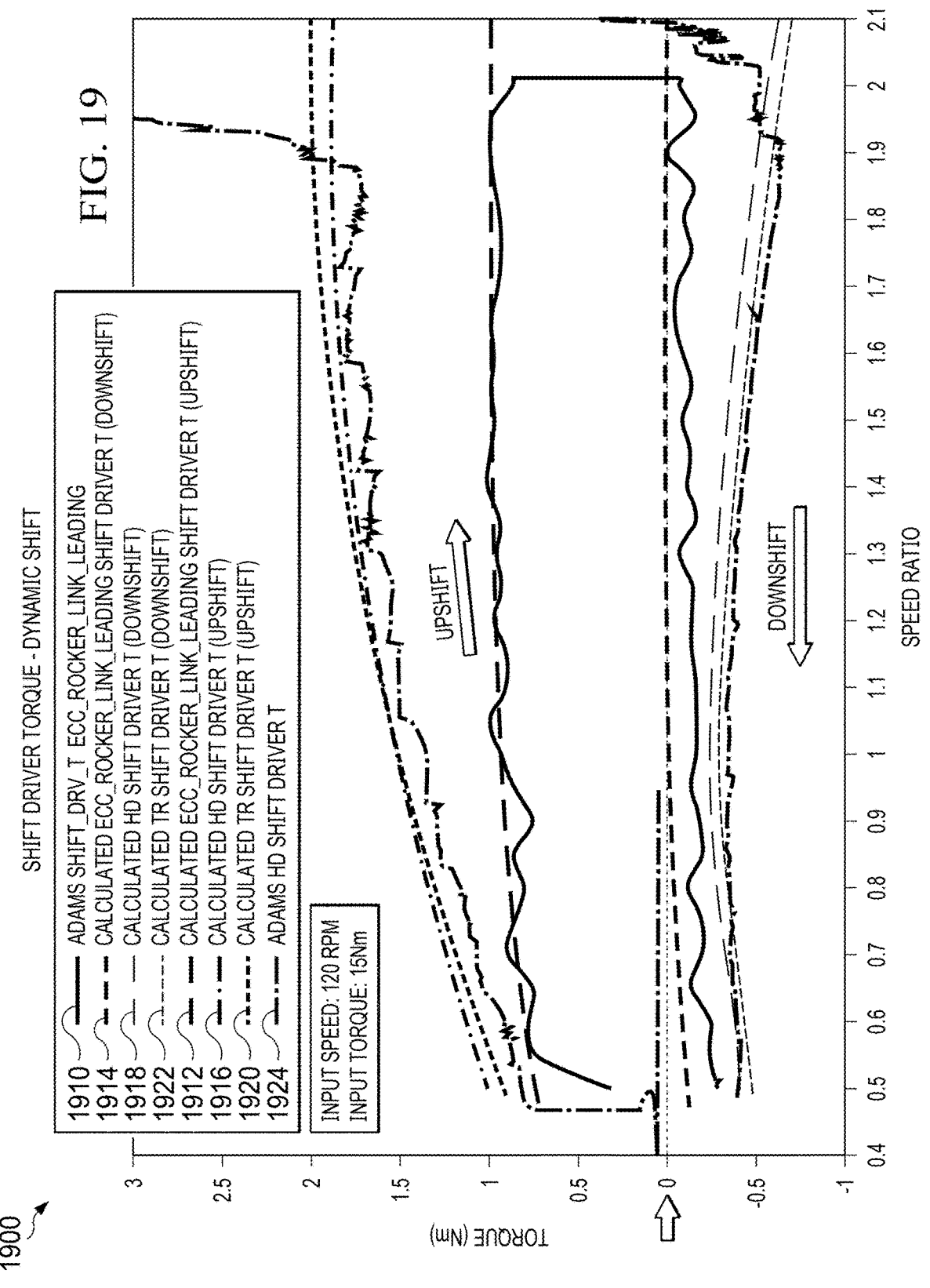
FIG. 19 depicts a graph illustrating calculated and simulated shift driver torque vs speed ratio for the embodiment of a CVP drive depicted in FIG. 7 during upshifting and downshifting.

FIG. 19 depicts chart 1900, illustrating a comparison of the simulation and calculations depicted in FIG. 18 against an ADAMS simulation and calculated results of an existing approach for shifting a CVP. As depicted in FIG. 19, line 1810 indicates that when upshifting using embodiments of a rocker link mechanism, shift driver torque remains near constant (i.e., shift forces will not increase as the shift ratio increases) and during the down shift, SD torque is near zero, indicating that the shift effort experienced will be negligible and the system is close to self-downshifting. Line 1812 depicts a calculated shift driver torque for upshifting and line 1814 depicts a calculated shift driver torque for downshifting. Line 1916 depicts a calculated shift driver torque for upshifting an existing CVP drive and line 1920 depicts a calculated traction ring torque when upshifting. Comparing line 1916 to line 1810, the shift driver torque for the HD CVP with existing shift mechanism is ~50% greater and continues to increase as the speed ratio increases during upshift. In the downshift cycle depicted by line 1920, the greater negative torque indicates increased shift forces. Thus, embodiments of an rocker gear link mechanism are generally easier to shift than existing approaches.

Figure 20:
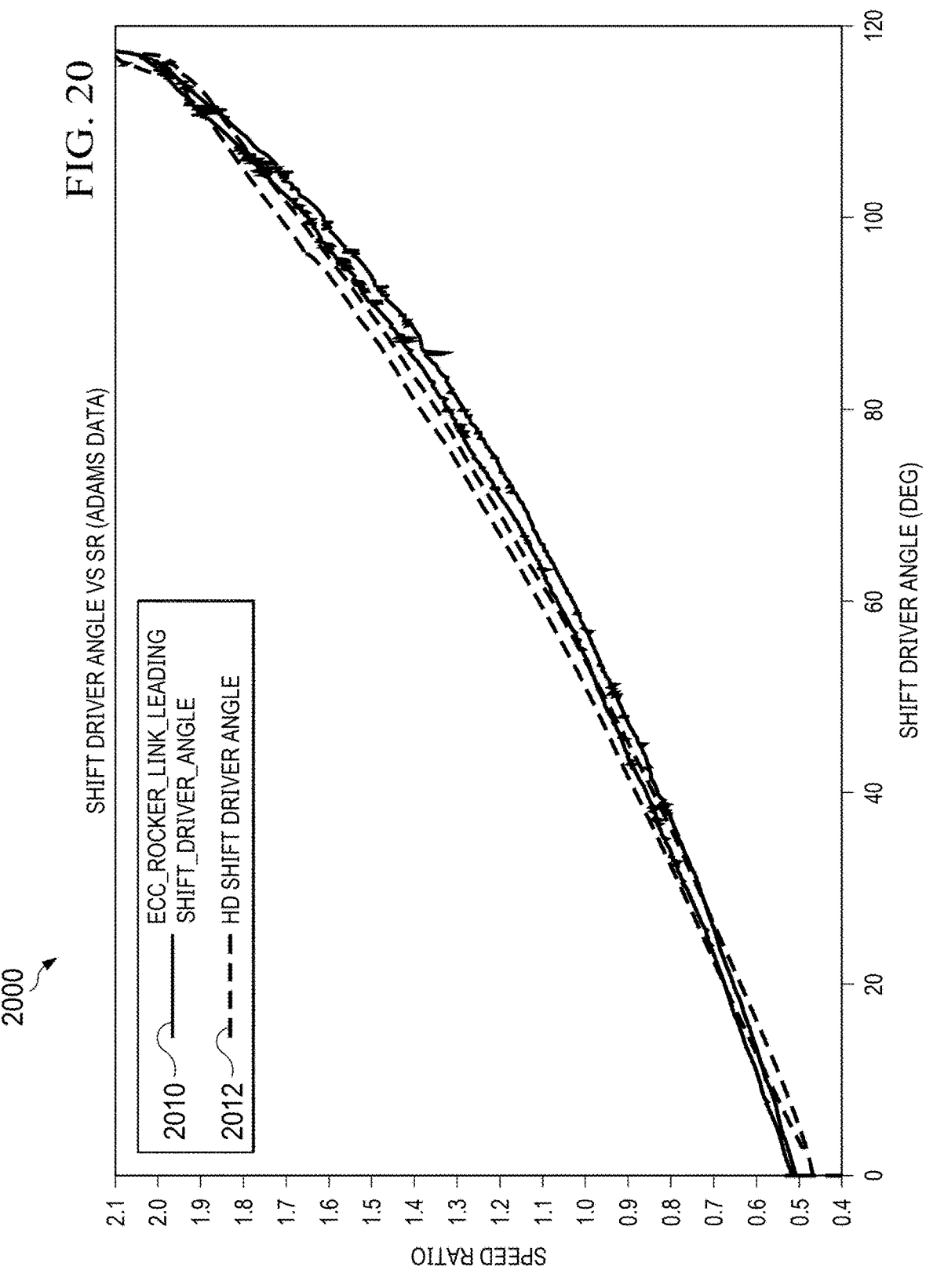
FIG. 20 depicts a graph illustrating calculated and simulated speed ratio vs shift driver angle for the embodiment of a CVP drive depicted in FIG. 7 during upshifting and downshifting.

FIG. 20 depicts a graph of speed ratio vs shift driver angle (in degrees) for comparing embodiments disclosed herein and for an existing approach. Line 2010 represents a calculation of speed ratio for an embodiment of a rocker link mechanism disclosed herein and line 2012 represents a calculation of speed ratio for an existing approach to adjusting a CVP. Comparing the two lines indicates that embodiments of a rocker link shift mechanism disclosed herein may shift slightly slower on the underdrive side and faster on the overdrive side compared to existing approach to adjusting a CVP.

Fast Dynamic Shifting

Figure 21:
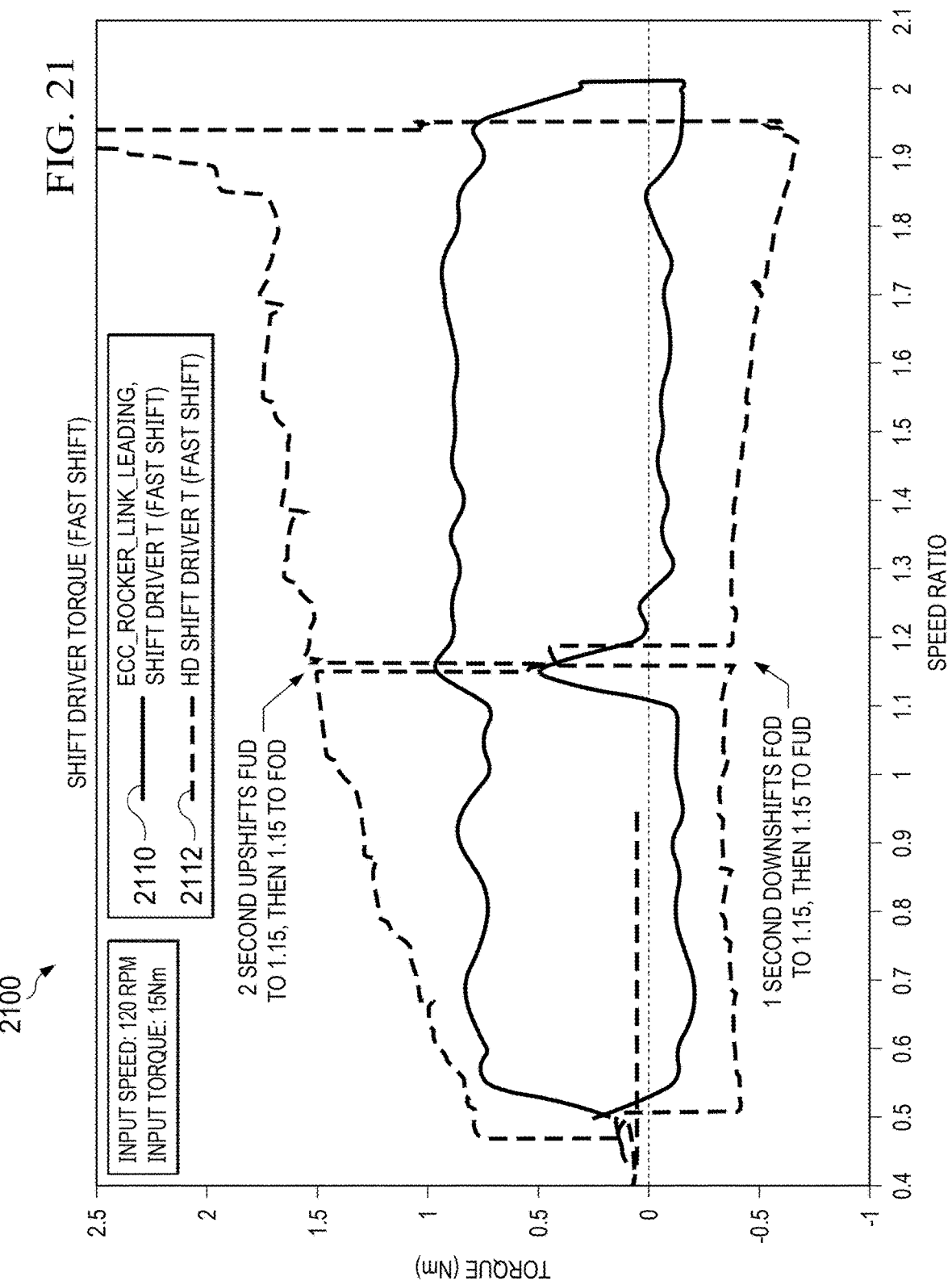
FIG. 21 depicts a graph illustrating calculated and simulated shift driver torque vs speed ratio for the embodiment of a CVP drive depicted in FIG. 7 during fast shifting (upshifting and downshifting)

Referring to FIG. 21, graph 2100 depicts results of a simulation of the shift forces at shift driver 54 when the rotation occurs in a short span of time (e.g., 2 seconds to upshift (FUD→1:1→FOD) or 1 second to downshift (FOD→1:1→FUD) for a constant input speed of 120 rpm and the torque remains constant. This simulates a user impulsively shifting the transmission during riding. Comparing line 2112 (calculated shift driver torque for existing approach to adjusting a CVP) to line 2110 (calculated shift driver torque for embodiments disclosed herein), the shift driver torque for existing shift mechanisms is greater at smaller speed ratios and continues to increase as the speed ratio increases during upshift. In the downshift cycle, the greater negative torque also indicates increased shift forces. Thus, embodiments of an rocker gear link mechanism offer significantly lower shift forces relative to existing HD shifting mechanism during upshifting and downshifting.

Figure 22:
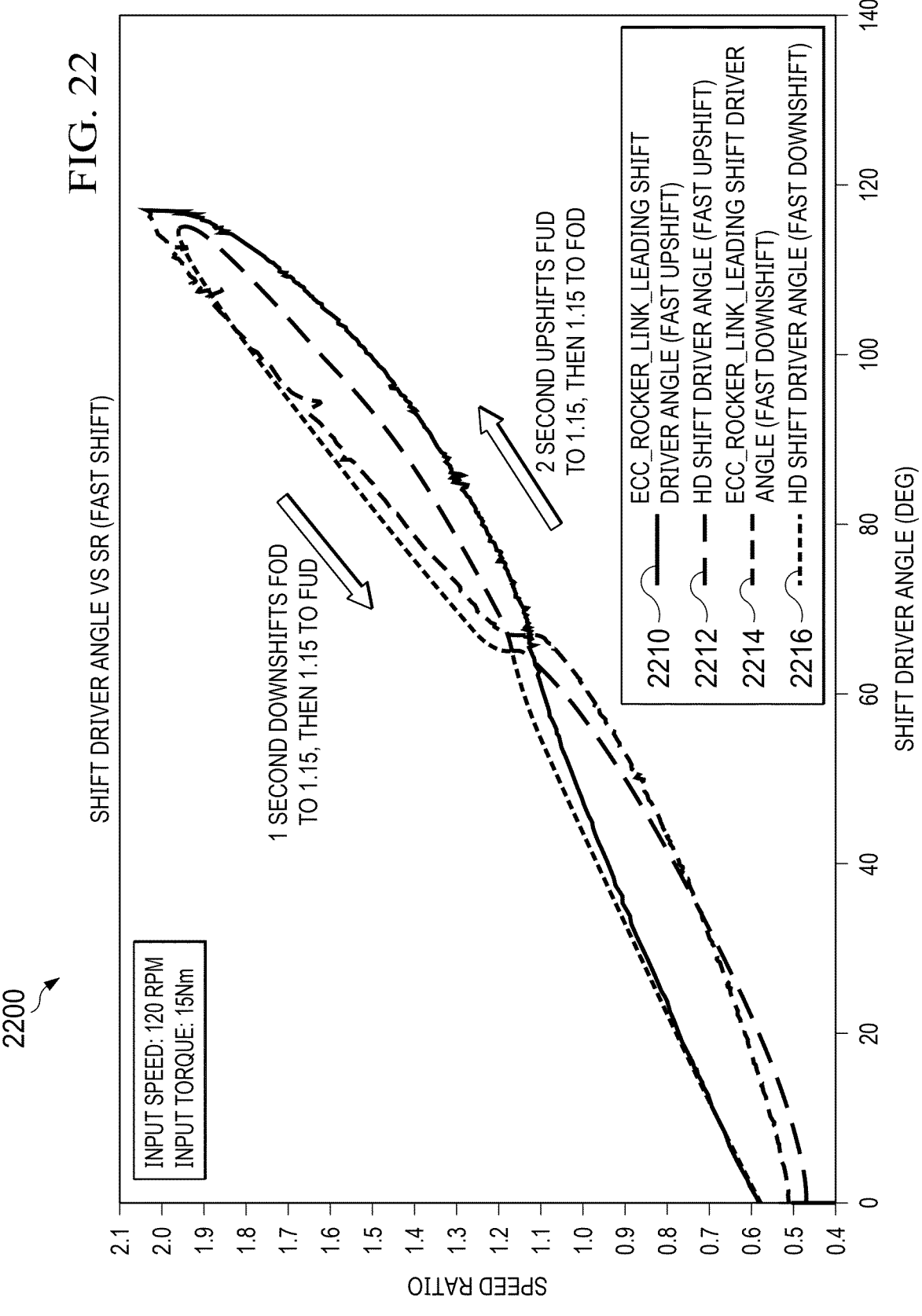
FIG. 22 depicts a graph illustrating calculated and simulated speed ratio vs shift driver angle for the embodiment of a CVP drive depicted in FIG. 7 during fast shifting (upshifting and downshifting)

FIG. 22 depicts graph 2200 comparing speed ratio vs shift drive angle between embodiments of CVP drive 700 and existing shifting mechanisms during upshifting and downshifting. Comparing line 2210 (corresponding to CVP drive 700) with line 2212 (corresponding to existing approaches), embodiments of CVP drive 700 may adjust a speed ratio slightly slower than existing approaches when upshifting. Comparing line 2214 (corresponding to CVP drive 700) with line 2216 (corresponding to existing approaches), embodiments of CVP drive 700 may adjust a speed ratio at about the same rate as existing approaches when upshifting.

Static Shifting

Figure 23:
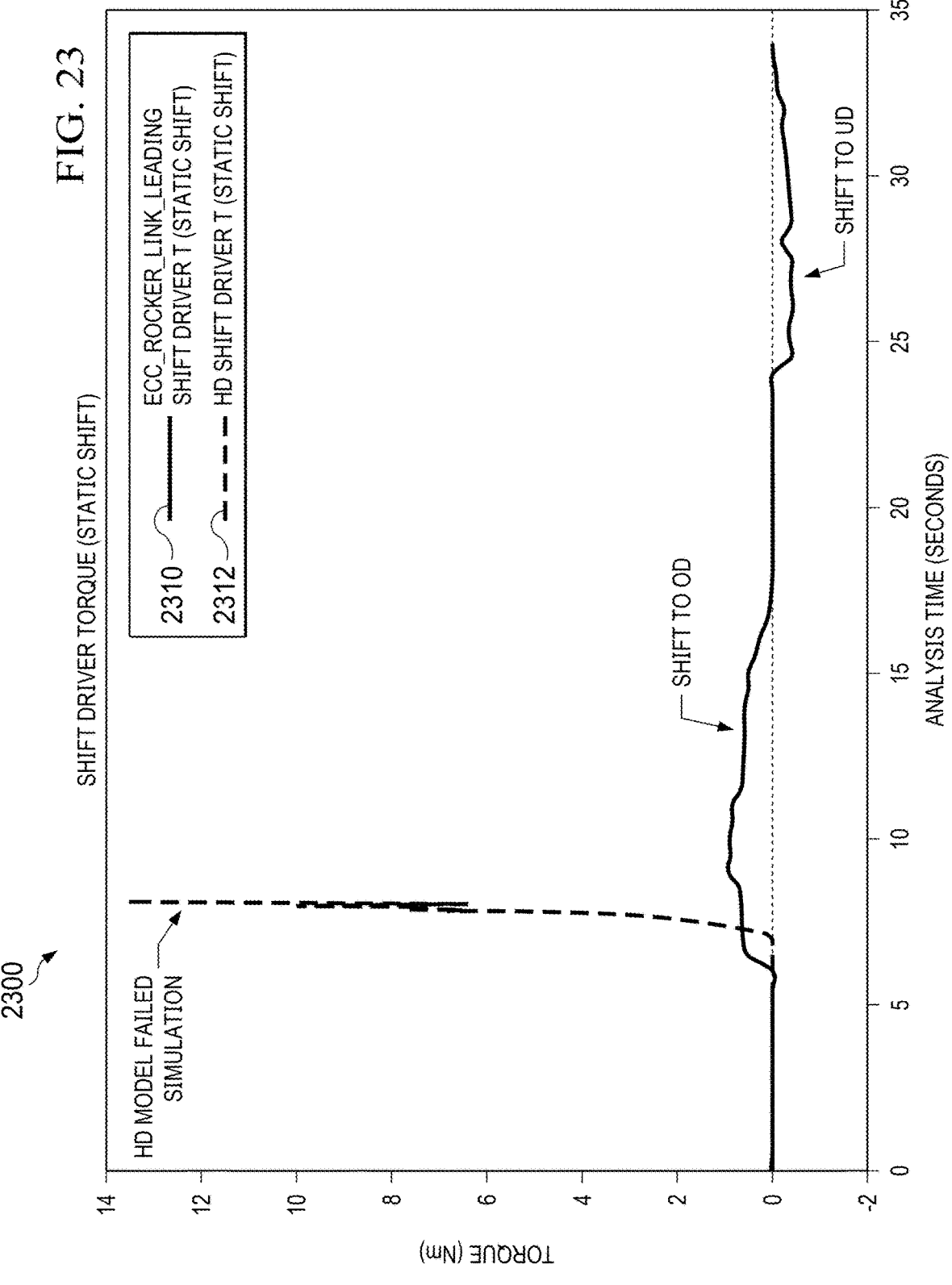
FIG. 23 depicts a graph illustrating calculated and simulated shift driver torque vs time for the embodiment of a CVP drive depicted in FIG. 7 (static shifting)
Figure 24:
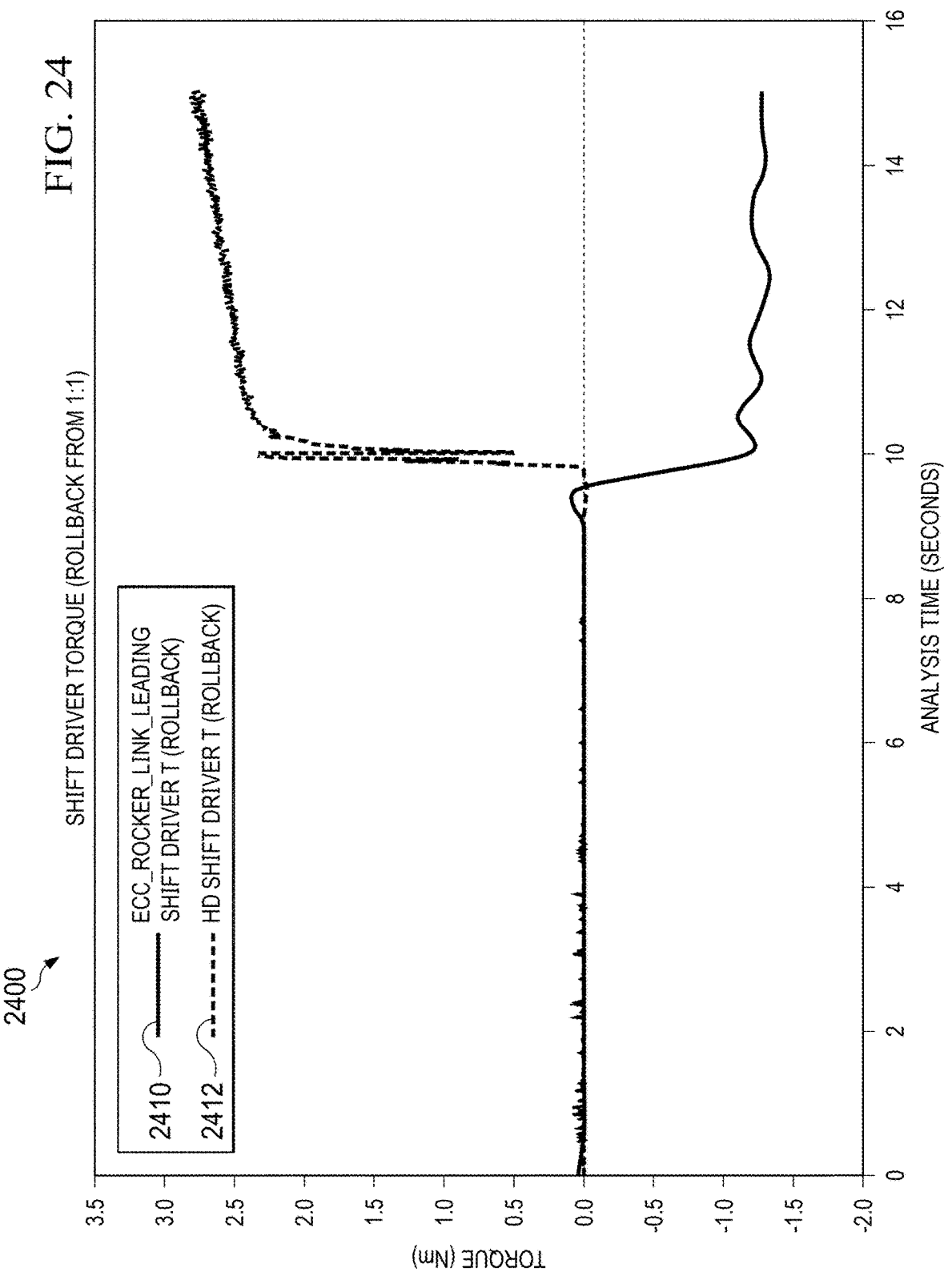
FIG. 24 depicts a graph illustrating calculated and simulated shift driver torque vs time for the embodiment of a CVP drive depicted in FIG. 7 (rollback)

FIGS. 23 and 24 are graphs depicting simulation results related to static shifting. In particular, FIG. 23 shows graph 2300 representing simulation results of the shift forces at shift driver 54 when the transmission is not rotating. For the simulation, a 100 N axial force is applied, the input torque is 0 Nm, traction ring 14-1 is free to rotate and traction ring 14-2 is locked.

Line 2310 shows static shift driver torque to be less than 2 Nm while shifting in the overdrive speed ratio zone and near 0 Nm for shifting in the underdrive speed ratio zone.

Rollback Torque

FIG. 24 depicts graph 2400 illustrating a simulation computing the shift forces at shift driver 54 when a reverse rotation is applied at traction ring 14-2. In a bicycle application this simulates a situation when the rider backs up the bike. This condition is simulated at 1:1 ratio, a 100 N axial force is applied, traction ring 14-1 is free to rotate, traction ring 14-2 is rotated forward at 40 rpm and shift driver 54 is rotated to adjust the speed ratio to be 1:1. As the CVP reaches 1:1, traction ring 14-2 is stopped and reverse rotation is applied to traction ring 14-2 at 30 rpm. Axial force is increased to 200 N during reverse rotation. Line 2410 in graph 2400 in FIG. 24 shows that torque on shift driver 54 tries to shift towards overdrive as the torque is negative. By contrast, line 2412 shows that current shifting mechanisms move to underdrive because the torque is positive.

Figure 25:
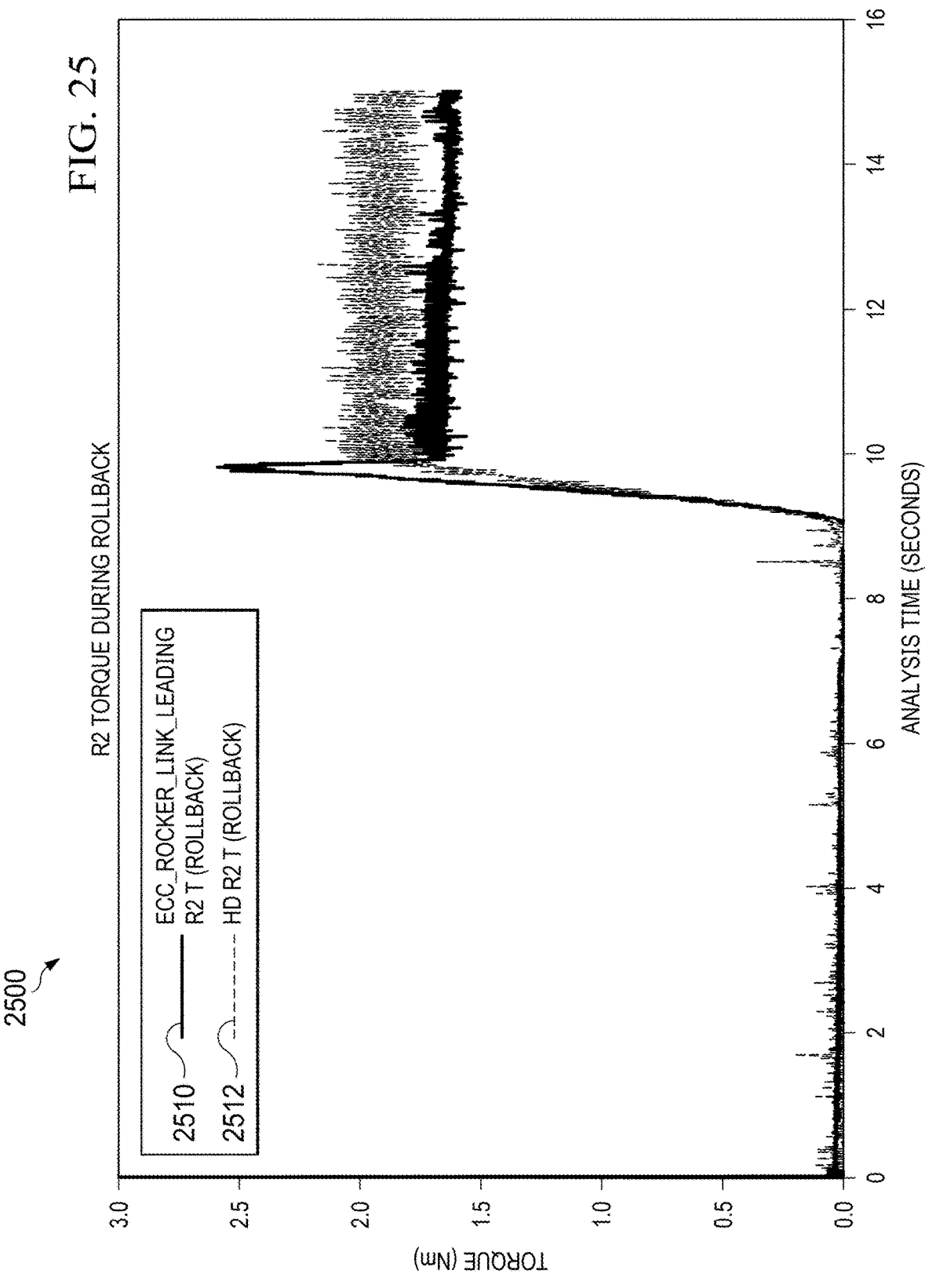
FIG. 25 depicts a graph illustrating calculated and simulated torque for the second traction ring vs time for the embodiment of a CVP drive depicted in FIG. 7 (rollback).

FIG. 25 depicts graph 2500 of the torque experienced by a rear wheel for one embodiment of CVP drive 700 compared to an existing approach to skew shifting. Comparing line 2510 corresponding to CVP drive 700 with line 2512 corresponding to an existing approach, the rollback resistance experienced at a traction ring 14-2 coupled to a wheel in CVP drive 700 is comparable to the rollback resistance experienced at a traction ring 14-2 coupled to a wheel in existing approaches.

The rocker gear link shift mechanism suggests the shift force can be reduced when compared to the current shifting mechanism. Simulation indicates shift force may be reduced by approximately 50%. The new concept suggests that changing the speed ratio when the transmission system is not rotating is plausible. The mechanism maintains the rollback functionality necessary when implementing a skew shifting CVP.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

13

What is claimed is:

1. A speed ratio adjusting mechanism for a continuously variable planetary (CVP) transmission having a plurality of planets disposed between a first traction ring and a second traction ring, the plurality of planets arranged around a main shaft defining a main axis of rotation, each planet having a planet axle defining a planet axis of rotation, the adjusting mechanism comprising:

a fixed carrier positioned on a first side of the plurality of planets, the fixed carrier comprising a first plurality of slots for receiving a first end of each planet axle;

a timing plate positioned on a second side of the plurality of planets, the timing plate being grounded to the fixed carrier and comprising a second plurality of slots for receiving a second end of each planet axle;

an input carrier positioned on the second side of the plurality of planets, the input carrier grounded to the timing plate;

a rocker link comprising a first end rotatably coupled to the first end of the planet axle;

a rocker gear rotatably coupled to a second end of the rocker link, the rocker gear comprising:

a journal rotatably coupled to the input carrier; and
an eccentric pin grounded to the timing plate; and a shift driver engaged with the rocker gear, wherein rotation of the shift driver rotates the rocker gear to rotate the rocker link, wherein the rocker link rotates the input carrier to impart a skew angle on the planet axle to cause the planet axle to tilt to a speed ratio.

2. The mechanism of claim 1, wherein:
the rocker gear comprises a rocker gear slot having a first stop face and a second stop face; and
the input carrier comprises a stop feature extending axially into the rocker gear slot, wherein:
the stop feature contacting the first stop face defines a minimum radial position of the second end of each planet axle, and
the stop feature contacting the second stop face defines a maximum radial position of the second end of each planet axle.

3. The adjusting mechanism of claim 1, wherein the rocker link is rotatably coupled to the rocker gear by a revolute joint.

4. The adjusting mechanism of claim 1, wherein the rocker link is rotatably coupled to the second end of each planet axle by a spherical joint.

5. The adjusting mechanism of claim 4, wherein the spherical joint comprises an axle cap on the second end of each planet axle.

6. A continuously variable planetary (CVP) transmission comprising:

a plurality of planets disposed between a first traction ring and a second traction ring, the plurality of planets arranged around a main shaft defining a main axis of rotation, each planet having a planet axle defining a planet axis of rotation;

an adjusting mechanism comprising:

a fixed carrier positioned on a first side of the plurality of planets, the fixed carrier comprising a first plurality of slots for receiving a first end of each planet axle;

a timing plate positioned on a second side of the plurality of planets, the timing plate being grounded to the fixed carrier and comprising a second plurality of slots for receiving a second end of each planet axle;

14 an input carrier positioned on the second side of the plurality of planets, the input carrier grounded to the timing plate;

a rocker link comprising a first end rotatably coupled to the first end of the planet axle;

a rocker gear rotatably coupled to a second end of the rocker link, the rocker gear comprising:

a journal rotatably coupled to the input carrier; and
an eccentric pin grounded to the timing plate;

a shift driver engaged with the rocker gear; and an actuator coupled to the shift driver, wherein the actuator provides an input to the shift driver to cause rotation of the shift driver to rotate the rocker gear to translate the rocker link, wherein translation of the rocker link imparts a skew angle on the planet axle to cause the planet axle to tilt to a speed ratio corresponding to the input.

7. The CVP transmission of claim 6, wherein:
the rocker gear comprises a rocker gear slot having a first stop face and a second stop face; and
the input carrier comprises a stop feature extending axially into the rocker gear slot, wherein:
the stop feature contacting the first stop face defines a minimum radial position of the second end of each planet axle, and
the stop feature contacting the second stop face defines a maximum radial position of the second end of each planet axle.

8. The CVP transmission of claim 6, wherein the rocker link is rotatably coupled to the rocker gear by a revolute joint.

9. The CVP transmission of claim 6, wherein the rocker link is rotatably coupled to the second end of each planet axle by a spherical joint.

10. The CVP transmission of claim 9, wherein the spherical joint comprises an axle cap on the second end of each planet axle.

11. The CVP transmission of claim 6, wherein the actuator comprises a manual actuator.

12. The CVP transmission of claim 6, wherein the actuator comprises an electromechanical actuator.

13. A vehicle, comprising:
a rotational power source;
a continuously variable planetary (CVP) transmission comprising:
a plurality of planets disposed between a first traction ring and a second traction ring, the plurality of planets arranged around a main shaft defining a main axis of rotation, each planet having a planet axle defining a planet axis of rotation;

an adjusting mechanism comprising:

a fixed carrier positioned on a first side of the plurality of planets, the fixed carrier comprising a first plurality of slots for receiving a first end of each planet axle;

a timing plate positioned on a second side of the plurality of planets, the timing plate being grounded to the fixed carrier and comprising a second plurality of slots for receiving a second end of each planet axle;

an input carrier positioned on the second side of the plurality of planets, the input carrier grounded to the timing plate;

a rocker link comprising a first end rotatably coupled to the first end of the planet axle;

a rocker gear rotatably coupled to a second end of the rocker link, the rocker gear comprising:

a journal rotatably coupled to the input carrier; and an eccentric pin grounded to the timing plate;

a shift driver engaged with the rocker gear; and an actuator coupled to the shift driver; and at least one wheel for receiving rotation power from the CVP, wherein the actuator provides an input to the shift driver to cause rotation of the shift driver to rotate the rocker gear to translate the rocker link, wherein translation of the rocker link imparts a skew angle on the planet axle to cause the planet axle to tilt to a speed ratio corresponding to the input.

14. The vehicle of claim 13, wherein:

the rocker gear comprises a rocker gear slot having a first stop face and a second stop face; and the input carrier comprises a stop feature extending axially into the rocker gear slot, wherein:

the stop feature contacting the first stop face defines a minimum radial position of the second end of each planet axle, and the stop feature contacting the second stop face defines a maximum radial position of the second end of each planet axle.

15. The vehicle of claim 13, wherein the rocker link is rotatably coupled to the rocker gear by a revolute joint.

16. The vehicle of claim 13, wherein the rocker link is rotatably coupled to the second end of each planet axle by a spherical joint.

17. The vehicle of claim 16, wherein the spherical joint comprises an axle cap on the second end of each planet axle.

18. The vehicle of claim 13, wherein the actuator comprises a manual actuator.

19. The vehicle of claim 13, wherein the actuator comprises an electromechanical actuator.

20. The vehicle of claim 13, wherein the vehicle comprises a bicycle.

\* \* \* \* \*